United States Patent
Dixon

(10) Patent No.: US 11,892,294 B1
(45) Date of Patent: Feb. 6, 2024

(54) SHALLOW UNDERWATER BUOY FOR GEODESY (SUBGEO)

(71) Applicant: University of South Florida, Tampa, FL (US)

(72) Inventor: Timothy Hugh Dixon, St. Petersburg, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 655 days.

(21) Appl. No.: 17/083,674

(22) Filed: Oct. 29, 2020

Related U.S. Application Data

(60) Provisional application No. 62/928,676, filed on Oct. 31, 2019.

(51) Int. Cl.
| | |
|---|---|
| *G01C 13/00* | (2006.01) |
| *G01S 19/42* | (2010.01) |
| *B63B 22/00* | (2006.01) |

(52) U.S. Cl.
CPC ............ *G01C 13/006* (2013.01); *B63B 22/00* (2013.01); *G01C 13/004* (2013.01); *G01S 19/42* (2013.01); *B63B 2022/006* (2013.01)

(58) Field of Classification Search
CPC .... G01C 13/006; G01C 13/004; B63B 22/00; B63B 2022/006; G01S 19/42
See application file for complete search history.

(56) References Cited

U.S. PATENT DOCUMENTS

| | | | | |
|---|---|---|---|---|
| 5,297,109 A | * | 3/1994 | Barksdale, Jr. ...... | G10K 11/006 367/106 |
| 5,784,338 A | * | 7/1998 | Yankielun .............. | G01N 17/00 367/13 |
| 5,790,471 A | * | 8/1998 | Yankielun .............. | H04B 17/27 367/13 |
| 6,501,704 B2 | | 12/2002 | Nishimura | |
| 6,678,589 B2 | | 1/2004 | Robertson et al. | |

(Continued)

FOREIGN PATENT DOCUMENTS

| CN | 110793507 B | * | 4/2022 | ........... G01C 13/002 |
|---|---|---|---|---|
| CN | 115077498 A | * | 9/2022 | |

(Continued)

OTHER PUBLICATIONS

Xie et al., Seafloor Geodesy in Shallow Water With GPS on an Anchored Spar Buoy, Nov. 20, 2019, pp. 12116-12140. (Year: 2019).*

(Continued)

*Primary Examiner* — Daniel Pihulic

(57) ABSTRACT

Various examples are provided for systems and methods for geodesy in shallow water. In one example, a method includes obtaining, from a sensor module, a position of a superstructure of a moored device. At least one measurement corresponding to a heading, a pitch, or a roll of the superstructure can be obtained from the sensor module. An estimated position of an anchor, ballast, or other seafloor marker of the moored device can be determined based on the position of the superstructure and at least one corrected heading associated with the at least one measurement. The at least one corrected heading can be determined by applying a magnetic declination correction to the at least one measurement.

19 Claims, 26 Drawing Sheets

(56) References Cited

U.S. PATENT DOCUMENTS

| | | |
|---|---|---|
| 8,437,979 B2 | 5/2013 | Frank et al. |
| 11,543,537 B1 * | 1/2023 | Li .......................... G01S 19/36 |
| 2009/0216444 A1 | 8/2009 | Crowell |
| 2023/0089476 A1 * | 3/2023 | Hajij ................... G01S 7/4802 |
| | | 382/156 |

FOREIGN PATENT DOCUMENTS

| | | |
|---|---|---|
| CN | 115201936 A * | 10/2022 |
| WO | 2012129612 A1 | 10/2012 |

OTHER PUBLICATIONS

Iannaccone, et al. (2018). Measurement of seafloor deformation in the marine sector of the Campi Flegrei caldera (Italy). Journal of Geophysical Research: Solid Earth, 123, 66-83. https://doi.org/10.1002/2017JB014852.

Dixon, et al., "Shallow Continental Shelves: a "no fly zone" for high precision sea floor geodesy, and a possible solution", 2017.

* cited by examiner

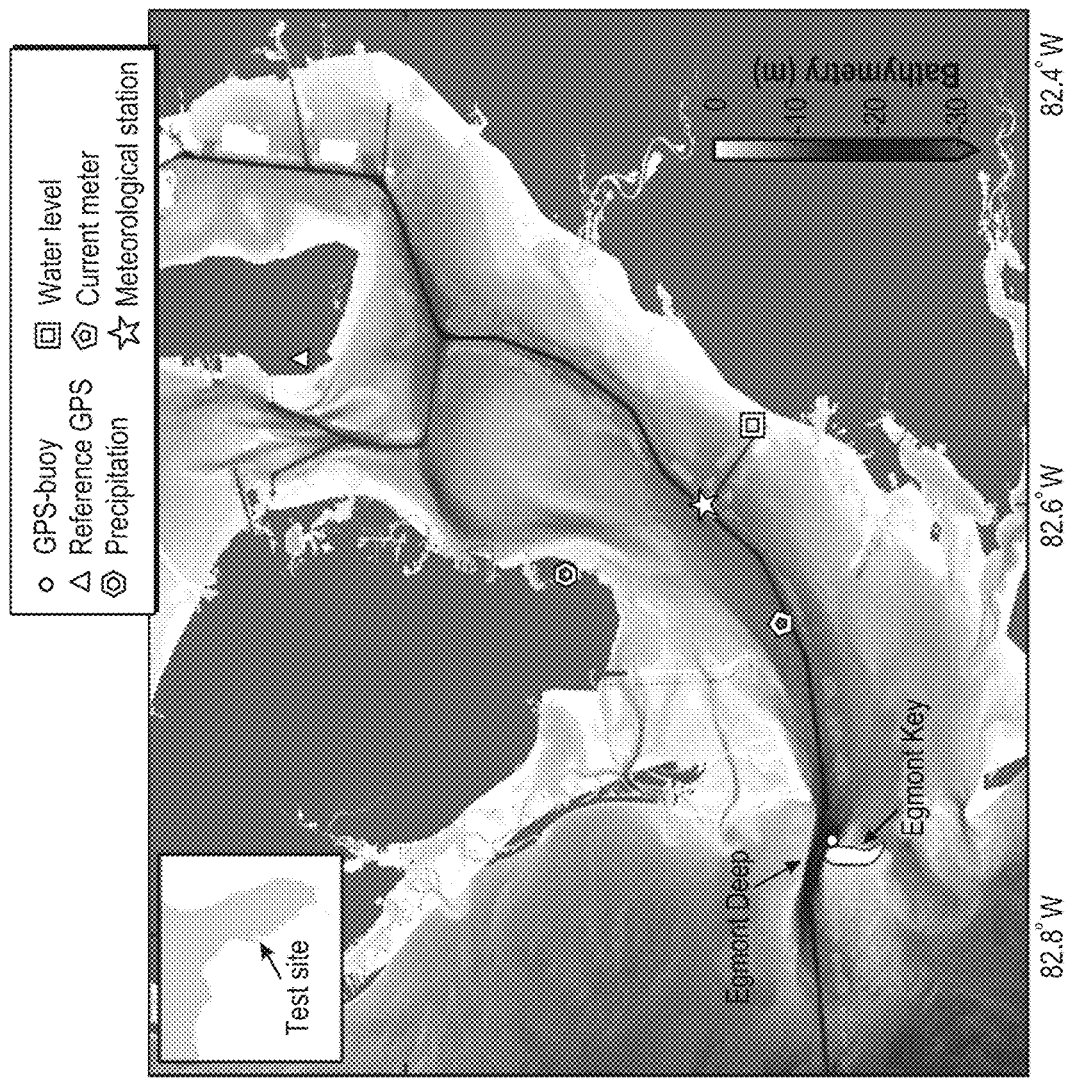
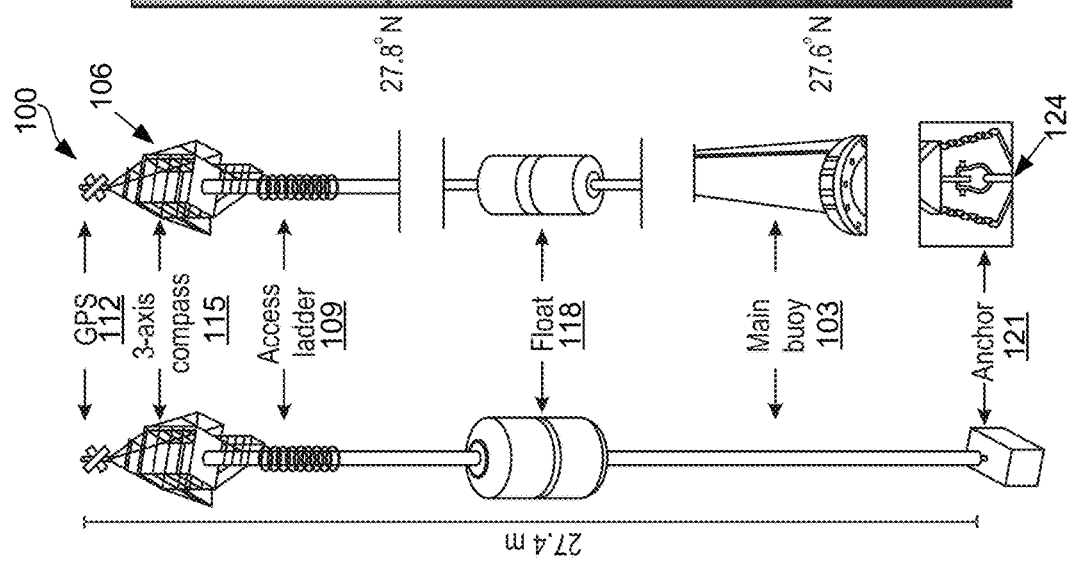
FIG. 1A
FIG. 1B

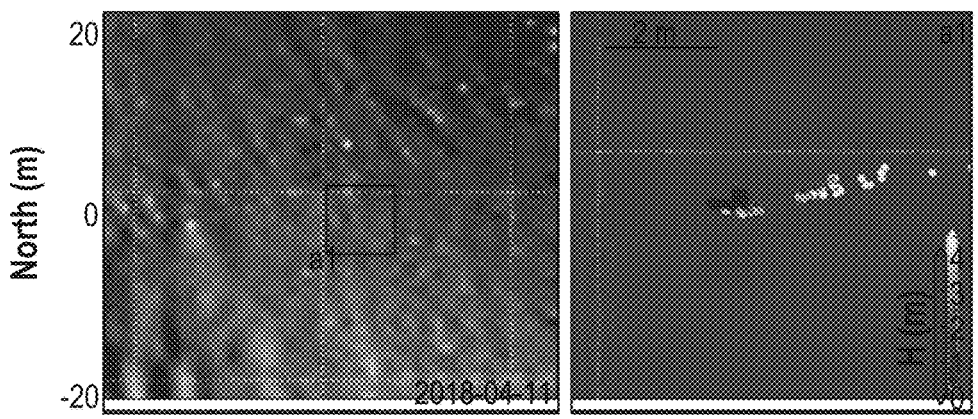
FIGS. 13A, 13A1
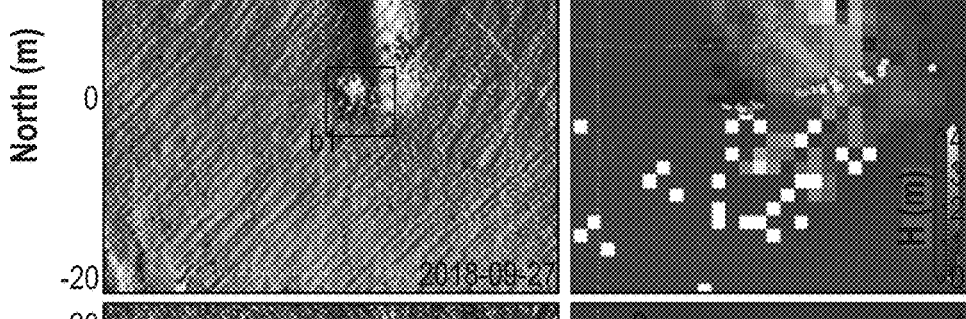
FIGS. 13B, 13B1
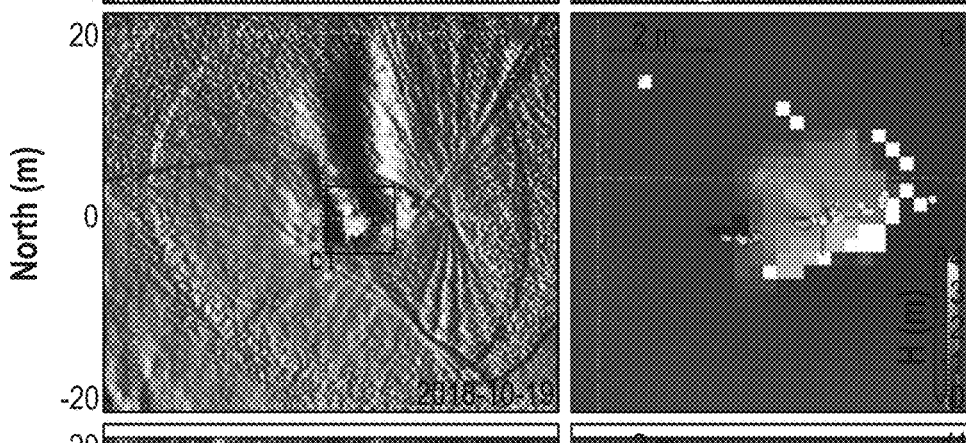
FIGS. 13C, 13C1
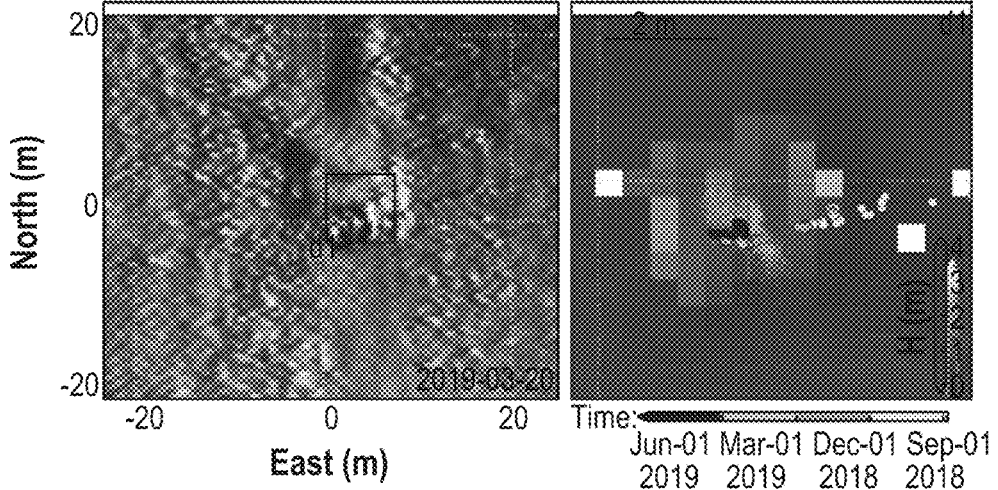
FIGS. 13D, 13D1

SHALLOW UNDERWATER BUOY FOR GEODESY (SUBGEO)

CROSS-REFERENCE TO RELATED APPLICATION

This application claims priority to and the benefit of, U.S. Provisional Application No. 62/928,676, filed on Oct. 31, 2019, entitled "SHALLOW UNDERWATER BUOY FOR GEODESY (SUBGEO)," the entire contents of which is hereby incorporated herein by reference.

STATEMENT REGARDING FEDERALLY SPONSORED RESEARCH OR DEVELOPMENT

This invention was made with government support under 1538179 and 2023633 awarded by the National Science Foundation. The Government has certain rights in the invention.

BACKGROUND

Measuring seafloor motion in shallow coastal water is challenging due to strong and highly variable oceanographic effects. Such measurements are potentially useful for monitoring nearshore coastal subsidence, subsidence due to petroleum withdrawal, strain accumulation/release processes in subduction zones and submerged volcanoes, and certain fresh water applications, such as volcano deformation in caldera-hosted lakes.

Space geodetic techniques such as global navigation satellite systems (GNSS) have achieved centimeter to millimeter precision and are now widely used to study Earth surface deformation. However, precise application of these techniques is limited to land, whereas 71% of the Earth's surface, and most plate boundaries, are covered by water. There is a need for high precision geodetic techniques that can work in the submarine environment.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A and 1B illustrate examples of a design of a moored device and a test site for the moored device, in accordance with various embodiments of the present disclosure.

FIGS. 13A, 13A1, 13B, 13B1, 13C, 13C1, 13D, and 13D1 illustrate examples of bathymetry from multibeam sonar surveys, in accordance with various embodiments of the present disclosure.

DETAILED DESCRIPTION

Figure 2A:
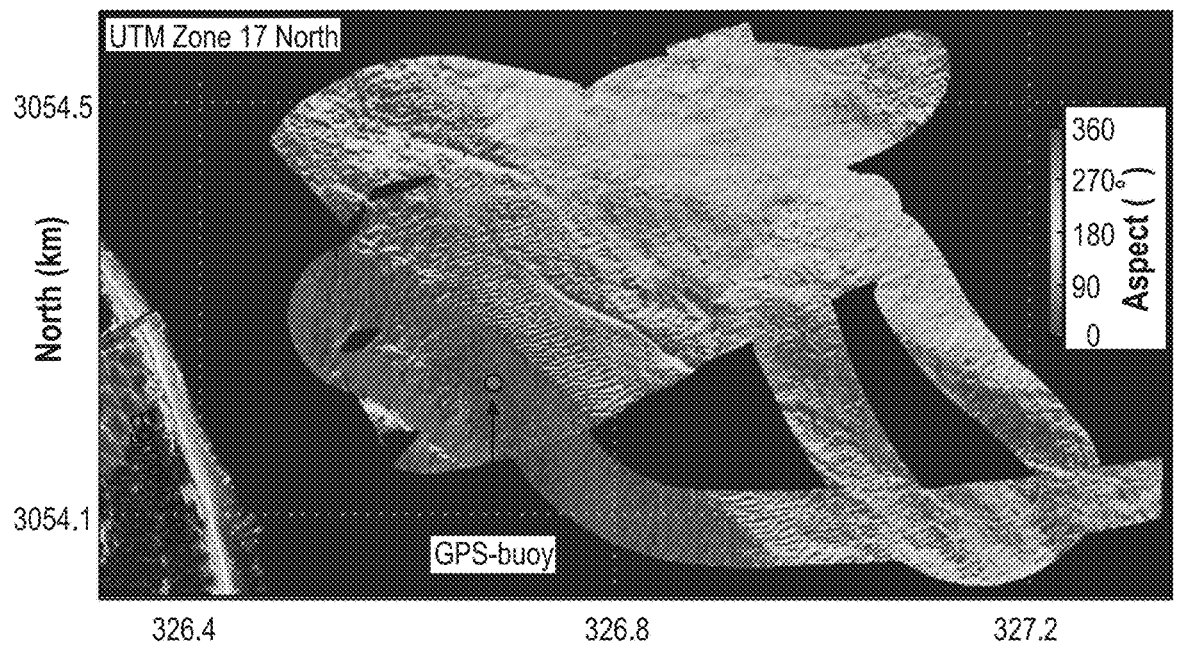
FIGS. 2A and 2B illustrate examples of bed characteristics of the test area, in accordance with various embodiments of the present disclosure.

Disclosed herein are various systems and methods for geodesy in shallow water, including measuring seafloor motion in shallow water with a depth less than 40 meters. In some embodiments described below, the system depth can also be extended to 200 meters. A position of the superstructure of a spar buoy or other portion of a moored device can be obtained from a high-precision Global Positioning System (GPS). A heading, pitch, and/or roll of the superstructure can also be determined. The disclosed systems and methods can determine an estimated position of a seafloor marker of the moored device based on the position, heading, pitch, and/or roll. The horizontal components of a displacement of the seafloor marker can also be determined. In some examples, at least one corrected heading can be determined by applying a magnetic declination correction to determine a heading offset associated with the heading measurement. Even in the presence of strong tidal currents, the disclosed systems and methods can achieve daily repeatability of seafloor positioning of approximately 1-2 cm for horizontal components and better than 1 cm for the vertical component.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the device and/or elements in addition to the orientation depicted in the drawings.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," "processing device," or "processing logic," as those terms are used herein encompass an electronic component that is able to execute a computer program or executable computer instructions. References herein to a system comprising "a processor," "a processing device," or "processing logic" should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

Space geodetic techniques such as global navigation satellite systems (GNSS) have achieved centimeter to millimeter precision and are now widely used to study Earth surface deformation. However, precise application of these techniques is limited to land, whereas 71% of the Earth's surface, and most plate boundaries, are covered by water. There is a clear need for high precision geodetic techniques that can work in the submarine environment.

While several techniques for seafloor geodesy are available, they typically work best in the deeper ocean (>1 km water depth) where noise introduced by oceanographic effects is relatively low. The coastal ocean is a more challenging environment for measuring seafloor displacements, because its spatially and temporally variable oceanographic effects can be significant. Potential applications of a shallow seafloor geodetic system include monitoring of:

1) Volcano deformation: Some active volcanoes have monitoring areas partly covered by shallow water. Marine examples include Anak Krakatoa in Indonesia, Santorini caldera in Greece and Campi Flegrei adjacent to the Bay of Naples, Italy. Fresh water examples include Yellowstone Lake in USA, Lake Taupo in New Zealand, and Lago Nicaragua, which includes Ometepe Island and an active volcano, Concepción.

2) Offshore oil fields: Oil and gas field management can lead to significant uplift and/or subsidence. Accurate monitoring can help to assess reservoir performance and infrastructure integrity.

3) Subduction zone strain accumulation and release processes: Many subduction zones have extensive shallow continental shelves that could host shallow seafloor geodetic systems, potentially improving understanding and forecasting of large and great subduction zone earthquakes and tsunami waves.

As described in De Martino et al. (2014) and Iannaccone et al. (2018), Instituto Nazionale di Geofisica e Vulcanologia (INGV, the Italian Institute of Geophysics and Volcanology) has developed a system of GPS-tracked rigid buoy capable of measuring vertical seafloor displacement in water depths shallower than 150 meters. INGV has operated four such buoys close to Campi Flegrei, Italy. INGV used weekly averaged values of the vertical displacement component to estimate seafloor uplift associated with volcanic deformation, achieving performance that is comparable to on-land GPS. Compared to the INGV device, the present systems and methods can perform various operations including determining both vertical and horizontal components of displacement. The design, construction, initial results, and potential applications for the proposed system and methods are further discussed below.

Regarding system design, the present systems and methods can be based on the Multiparametric Elastic-beacon-based Devices and Underwater Sensor Acquisition (MEDUSA) system used by INGV to monitor vertical deformation of the seafloor in the Gulf of Pozzuoli in southern Italy, adjacent to the Campi Flegrei volcanic area. The INGV infrastructure uses a Global Navigation Satellite System (GNSS) receiver installed on top of each buoy, connected to the seafloor by either a rigid spar, or in deeper water (>40 m), a steel cable. Assuming that buoyancy maintains a near-vertical orientation, vertical displacement of the seafloor can be estimated by correcting for the fraction of measured surface vertical motion induced by surface horizontal motion of the buoy using simple geometry. The proposed systems and methods can add heading, pitch, and/or roll measurements to the system, and perform a 3-dimensional transformation to recover both horizontal and vertical components of the motion of the seafloor marker. Some examples of this disclosure use the term ballast and/or anchor to refer to the seafloor marker. The present system, called SUBGEO (Shallow Underwater Buoy for Geodesy) in some examples, can be used in coastal regions shallower than 40 meters. It can also be used in deeper water (up to 200 m). In some cases, additional orientation measurements can be performed. For example, the disclosed system can include a wire rope or cable between the sea floor ballast and the rigid spar, and one or more orientation sensors coupled or connected to the at least one of the wire rope or the cable.

The use of high precision GPS systems for measuring seafloor movement can benefit from both stability and a direct connection to the seafloor, while also keeping the antenna and electronics safely above the waterline in most, if not all, anticipated sea states. Given these goals, a design can include a moored device that includes a long spar (e.g., that provides at least a portion of a connection from a GPS antenna to the seafloor), excessive net flotation for stability, and a ballast that holds the moored device in place.

Referring to FIGS. 1A and 1i, shown are examples of a system design and test site. In FIG. 1A, the above-waterline section of the moored device 100 can include a buoy 103, a superstructure 106 (e.g., an upper part of a superstructure), and an access ladder 109. A GPS antenna 112 can be mounted at a location that can provide appropriate measurements, for example on the top and/or at the top and center of the superstructure 106. A GPS receiver, a digital compass or other sensor module 115, and associated electronics can be rigidly connected to the superstructure 106. Exterior-mounted solar panels can be provided adjacent to the aforementioned electronics. The electronics can also be installed in a weather-proof enclosure. Below the waterline, a float 118 (e.g., a polyurethane foam float) can be installed at a depth that ensures that it is continuously submerged regardless of sea state. Combined with increased displacement achieved by welding caps on the individual spar components, a net buoyancy of 9 tons can be provided to maintain the buoy 103 in a nearly vertical position. At the bottom of the moored device 100, an anchor or other seafloor marker 121 can be provided. For example, a 2.4 m×2.4 m×1.7 m concrete ballast reinforced by steel rebar can be used as the seafloor marker 121. The ballast can be rigidly connected or otherwise attached to the buoy 103 or other component of the moored device 100, for example with a shackle 124. The concrete can provide a ballast of approximately 13 tons when submerged in seawater. Therefore, when the buoyancy and ballast are combined, a net ballast (negative buoyancy) of more than 4 tons can be achieved. FIG. 1A shows the GPS 112 can be at or near to a top of the buoy 103, and associated electronics can be mounted in a box below the GPS 112. The system can be powered by solar-charged batteries. A float 118 can provide buoyancy, keeping the buoy 103 close to vertical. The buoy 103 can be attached to the seafloor marker 121 through the shackle 124.

FIG. 1B shows bathymetry of a test site located on the bay side of Egmont Key within Tampa Bay, Florida at a water depth of ~23 m. Markers show the test site and other nearby instruments. Note that FIG. 1B shows the location of the moored device 100 ("GPS-buoy") close to a tidal outflow channel. This section of the West Florida continental shelf is part of a broad, mostly submerged ancient carbonate platform with a thin layer of unconsolidated sediment over Miocene limestone. While the site is protected from some of the wave energy from the Gulf of Mexico by Egmont Key, it experiences strong ebb and flood tidal currents. Maximum current speeds in the channels adjacent to Egmont Key range from 1.8 m/s on the ebb tide to nearly 1.1 m/s on the flood tide. These currents cause correspondingly large deflections of the buoy from the vertical position and hence provide a rigorous test of the disclosed approach to horizontal motion corrections. The site is adjacent to the busy Egmont shipping channel and occasionally experiences wake from passing ships.

The deployment location of the moored device 100 is at the southern edge of a ~30 m deep known as Egmont Deep (previously Egmont Hole; FIG. 1). This deep and its connection to the Egmont Channel is analogous to the geologic term "gorge" or "throat", which is a deep scoured bathymetric feature found at most barrier island inlets (or passes) experiencing strong currents. The deepest part, the gorge, is formed and maintained by the strong tidal currents entering and exiting Tampa Bay. The formation of Egmont Deep is likely the result of a combination of karst and scour processes. The limestone bedrock here was subaerially exposed repeatedly during previous sea level low stands. Following the most recent ice age, sea level rose and flooded Tampa Bay, with subsequent sediment infilling of the deeps and channel scouring. Sediments adjacent to Egmont Deep consist primarily of coarse carbonate shell fragments, and siliceous sand and silt.

SCUBA observations made in December 2000 showed a seafloor nearly devoid of sediment, composed of smooth limestone with phosphatic nodules and small scour pits. Only large, rubble-sized limestone debris, oyster shells, and human trash were observed as unconsolidated materials in or near the deepest areas. Further north, a 30-m transect showed multi-colored sponges. In April 2001, another SCUBA survey showed a surface buried by ~0.5 m of shell fragments and coarse sediment, with previous rubble-sized debris no longer visible, possibly buried. These observations suggest a highly dynamic seafloor environment, presumably due to strong tidal currents, with any fine-grained sediment entering Egmont Deep periodically transported out of the area. The location of the moored device 100 is immediately southeast of the deepest, high velocity part of the channel, and at the present time contains some reworked sediments, subaqueous dunes, and smaller sedimentary bedforms (FIG. 2A).

Figure 2B:

FIGS. 2A and 2B illustrate examples of bed characteristics of the test area. FIG. 2A shows a bed aspect map derived from multibeam sonar survey data. Aspect changes from light blue to red indicate subaqueous dunes. Aspect of 0° and 360° denote bed facing north. Diver observations on Oct. 1, 2019 showed the presence of unconsolidated sandy sediment at least 1.5 meters thick, based on the length of rebar driven into the sediment. Previous research has compared bathymetry collected using the same multibeam system (Kongsberg Simrad® EM3000 300 kHz system) from surveys made in 1999 and 2001. They observed large dunes near the study site with 2 m vertical relief, an average slope of 6°, and average wavelength of 150 m, with smaller superimposed dunes with typical relief of 0.3 m, wavelength of 5-9 m, and length of ~50-150 m. At the study area, smaller dunes are observed with some slopes up to ~10°. In April 2018, multibeam data from a Reson SeaBat T50-R dual head 200-400 kHz system (run at 400 kHz) were collected in the study area. These data also show the presence of numerous small subaqueous dunes near the buoy location (FIGS. 2A, 2B). FIG. 2B shows an image of the seafloor at the test site during deployment. The diver's hand (in a black neoprene glove) is penetrating several centimeters of soft sediment. Sediment here is primarily sand, with a thin muddy layer and some organisms above it. The unconsolidated sediment is at least 1.5 meters thick.

Regarding deployment, the disclosed system's application of high-resolution GPS can benefit from a moored device 100 with a net flotation and a mass of ballast to provide sufficient stability while also keeping the antenna and electronics above the water line in most (or all) sea states. The system's spar length of ~30 meters and combined in-air weight of ~27 tons makes the deployment logistically complicated.

While the moored device 100 can be designed to be deployable in two stages, allowing a fully instrumented tower to be bolted onto the uppermost spar flange after it is in place, it can also be deployed as a single stage. Strong tidal currents can introduce potential issues with aligning the two flanges near the waterline in a two-stage deployment. For this reason, the moored device 100 can be deployed fully assembled (or fully assembled and without electronics). If fully assembled without electronics, the electronics can be installed via a small boat after at least a portion of the moored device 100 (e.g., the buoy 103 or the superstructure 106) is in place.

Figure 3:
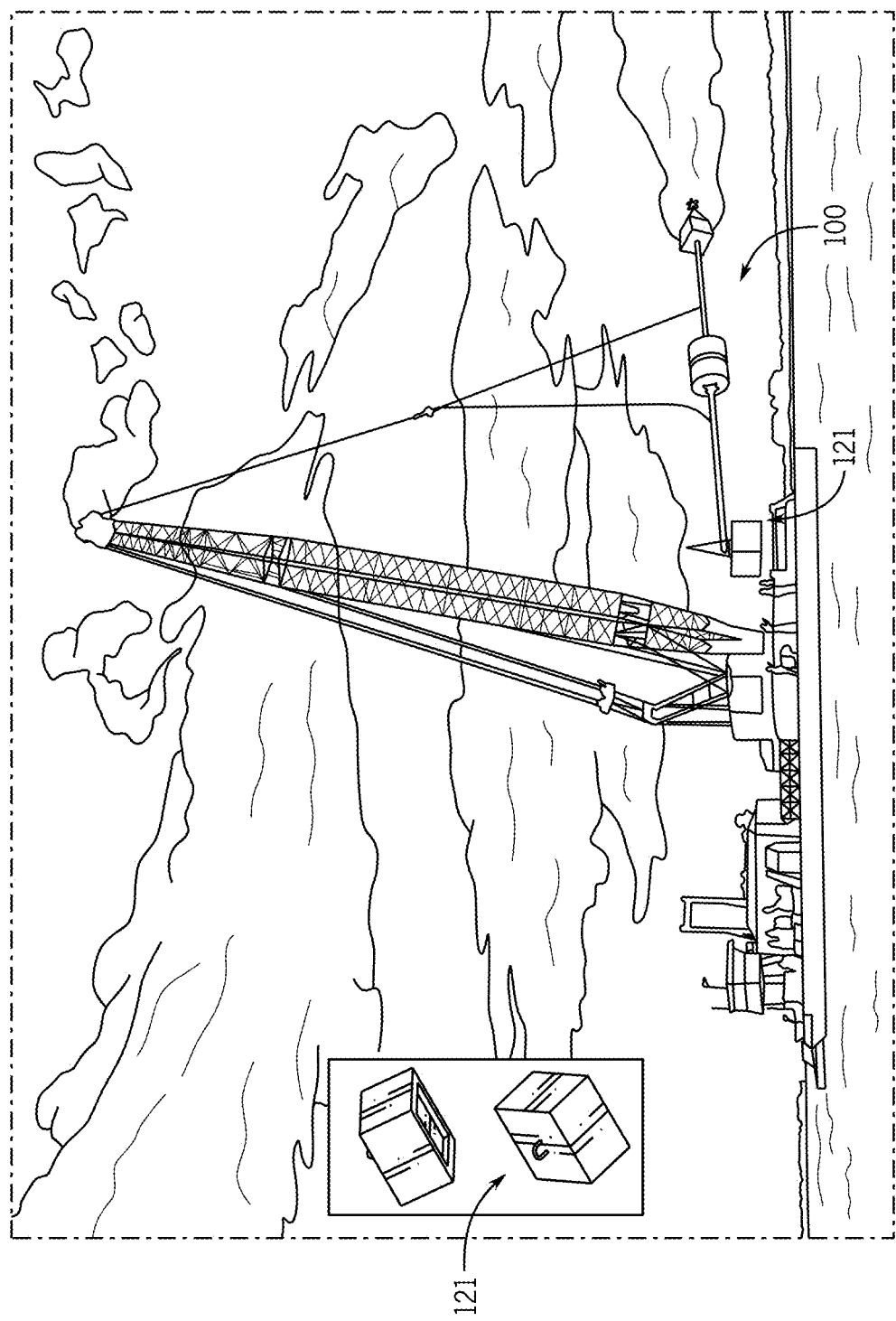
FIG. 3 illustrates an example of a deployment of the moored device, in accordance with various embodiments of the present disclosure.

FIG. 3 illustrates an example of a deployment of the moored device 100. As shown in FIG. 3, the seafloor marker 121 can be lifted via the main winch line while an auxiliary line supports a spar section of the moored device 100 at two lifting points with a custom sling. This method can reduce the time required for the crane and barge to be on site. A deployment was executed successfully on Aug. 23, 2018, with data transmitting 6 hours after the seafloor marker 121 was placed on the bottom. As FIG. 3 shows, the main winch line can be attached to the seafloor marker 121 while the auxiliary line with two-point sling supports the spar section. Insets of FIG. 3 show that the seafloor marker 121 can include a ballast with an indented bottom. The use of a large crane with an auxiliary line can make a single-stage deployment possible.

Regarding data analysis, data from the GPS 112 can be collected at 15-second intervals. Heading, pitch, and/or roll can be measured by the digital compass or other sensor module 115 every 5 seconds with 0.1° resolution. The GPS 112 and/or the sensor module 115 can be used to determine the near-instantaneous (e.g., ten minute average) position of sea level. This functionality may be useful in offshore locations, where tide gauges are not generally deployed. The process can involve interferometric techniques using both the direct (sky) wave of a GPS or a GNSS signal, and a reflected wave from the sea surface. The signal to noise ratio associated with the interference pattern changes over several minutes, representing destructive and constructive interference as the observation geometry changes as the satellite passes overhead, and is sensitive to both sea level and the height of the antenna above the sea surface. Since the antenna height is known, the instantaneous sea level can be estimated. Precision can be similar to a coastal tide gauge. All data can be downloaded through a link such as a radio, satellite, or optical link. Examples of this disclosure used a Freewave® radio device to create a link to a point about 2.5 km away from the moored device 100. This disclosure reports on data obtained between 23 Aug. 2018 and 24 Aug. 2019, among other data. Data gaps during this period occurred <0.01% of the time.

Figures 4A, 4B:
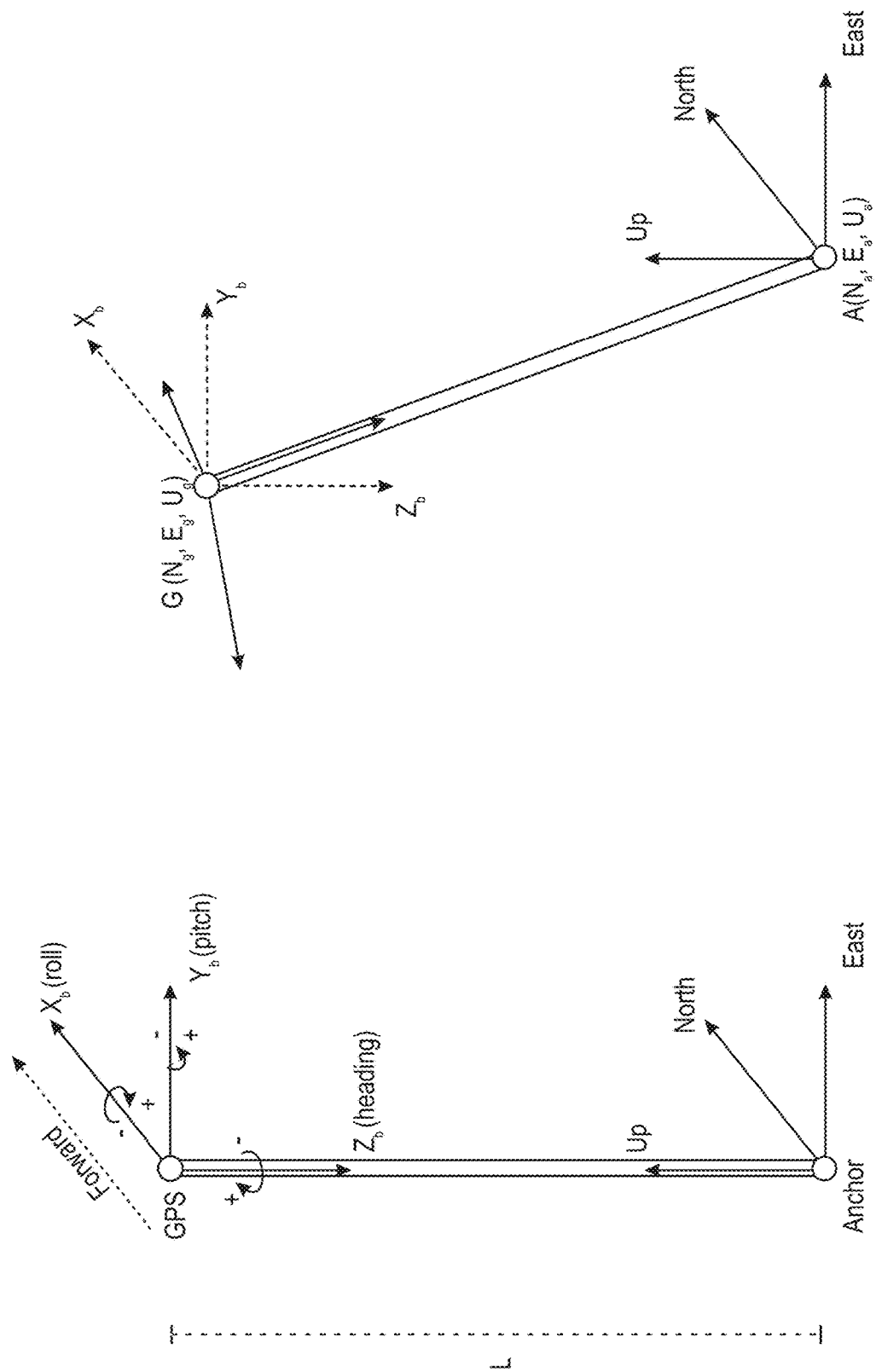
FIGS. 4A and 4B illustrate examples of observation geometry of the system, in accordance with various embodiments of the present disclosure.

FIGS. 4A and 4B illustrate examples of observation geometry of the disclosed system. The present systems and methods can include a three-dimensional transformation to estimate a position of the seafloor marker 121. The displacement of the seafloor marker 121 can be determined and used as a proxy for seafloor motion. Because of its large mass, it is relatively stable except in limited circumstances (e.g., during extreme sea states or weather events). FIGS. 4A and 4B show the system geometry. FIG. 4A depicts the state of the system when the buoy 103 (represented by thick line) is vertical and three axes of the sensor module 115 are at initial orientations (e.g., heading, pitch, and/or roll measurements are zero). Signs of these measurements follow the right-hand rule. FIG. 4B depicts the state of the system when the GPS 112 and sensor module 115 are perturbed from initial positions. Solid arrows show perturbed orientations of heading, pitch, and roll axes. Dashed arrows show reference directions. Position ($N_a$, $E_a$, $U_a$) for the seafloor marker 121 can be calculated using:

$$\begin{bmatrix} N_a \\ E_a \\ U_a \end{bmatrix} = \begin{bmatrix} N_g \\ E_g \\ U_g \end{bmatrix} + \begin{bmatrix} N_{ag} \\ E_{ag} \\ -U_{ag} \end{bmatrix} \quad (1)$$

where ($N_g$, $E_g$, $U_g$) are north/east/up components of the GPS position, and ($N_{ag}$, $E_{ag}$, $U_{ag}$) represent seafloor marker 121 coordinates defined in a local Cartesian coordinate system G-$X_b Y_b Z_b$, whose origin is at the GPS antenna phase center, and whose three axes point to geographic north/east/down (shown in FIG. 4A by blue/cyan/red colored arrows). ($N_{ag}$, $E_{ag}$, $U_{ag}$) can be calculated using a 3-axis rotation:

$$\begin{bmatrix} N_{ag} \\ E_{ag} \\ U_{ag} \end{bmatrix} = R_z(-\alpha) R_y(-\beta) R_x(-\gamma) \begin{bmatrix} 0 \\ 0 \\ L \end{bmatrix} \quad (2)$$

where L is the length of the buoy 103 (defined, e.g., as length from the GPS antenna phase center to a pivot point of the seafloor marker 121). α, β, and γ can be measured heading, pitch, and roll angles of the buoy 103. Their signs can be defined by the right-hand rule (FIG. 4A). The three rotation matrices in equation (2) can be calculated by:

$$R_x(-\gamma) = \begin{bmatrix} 1 & 0 & 0 \\ 0 & \cos(\gamma) & -\sin(\gamma) \\ 0 & \sin(\gamma) & \cos(\gamma) \end{bmatrix} \quad (3)$$

$$R_y(-\beta) = \begin{bmatrix} \cos(\beta) & 0 & \sin(\beta) \\ 0 & 1 & 0 \\ -\sin(\beta) & 0 & \cos(\beta) \end{bmatrix} \quad (4)$$

$$R_z(-\alpha) = \begin{bmatrix} \cos(\alpha) & -\sin(\alpha) & 0 \\ \sin(\alpha) & \cos(\alpha) & 0 \\ 0 & 0 & 1 \end{bmatrix} \quad (5)$$

Based on equations (1-5), for a given time, if GPS position and heading, pitch, and roll of the superstructure 106 are measured, position of the seafloor marker 121 can be estimated. Note that heading in these equations is relative to geographic north, therefore a correction for magnetic declination or orientation bias can be utilized.

The disclosed systems and methods can also include features for GPS data processing. For example, GPS data can be processed using the TRACK v1.30 kinematic processing software, and using variations of techniques described by Herring, T. A., King, R. W., Floyd, A. A., and McClusky, S. C. (2018) in "GAMIT Reference Manual, GPS Analysis at MIT, Release 10.7" at *Mass. Inst. of Technol., Cambridge*. Data was also processed using the GPS processing tool Canadian Spatial Reference System (CSRS) that is provided by the Canadian Geodetic Survey (https://webapp.geod.nrcan.gc.ca/geod/tools-outils/ppp.php?locale=en). For TRACK processing, a reference station can be used. Examples of this disclosure used a stationary GPS site 35 km away from the buoy 103 which can be used as a reference station (as depicted in the red triangle shown in FIG. 1). The kinematic site positions, representing the instantaneous position of the phase center of the GPS on top of the buoy 103, are estimated in long baseline mode, with motion modeled as a random walk. A threshold for allowable changes in velocity for all three components, or for individual components, can be set at 1 m per second, which is an approximation for the speed of a typical tidal current in the area of the test site. A cut-off angle of 15 degrees can be used to reduce the influence of multi-path. GPS position can be estimated at 15 second intervals, the sampling rate of the GPS observations. In some examples, sampling rates can be 1 second interval, 30 second intervals, or another interval that can allow for accurate position estimation.

GPS raw data can be written as daily files. To reduce potential jumps at the boundaries of each day due to smoothing gaps, session files can be formed from 30 hours of data centered on the middle of each day. For jumps (such as those caused by slip of the seafloor marker 121 immediately after deployment, hurricanes, or periods of other extreme weather), data within 2 hours of a jump can be omitted. Sessions can be selected so that sessions do not span the jumps. After finishing each processing session, position estimates the day before and after (e.g., data during 21:00-24:00 in the previous day and 00:00-03:00 in the next day) can be removed. Epochs with any ambiguities unfixed to integer values can be deleted. Typical formal error estimates for a single epoch are 1.5-2.0 cm for the horizontal components and 4-5 cm for the vertical component. Note that TRACK can use differential phase measurements to estimate GPS positions, thus observations from both the kinematic and reference stations can be utilized. Data gaps (mainly due to data gaps in the reference station) can lead to solution gaps, and possibly account for a small fraction of the resulting displacement time series.

Figure 5:
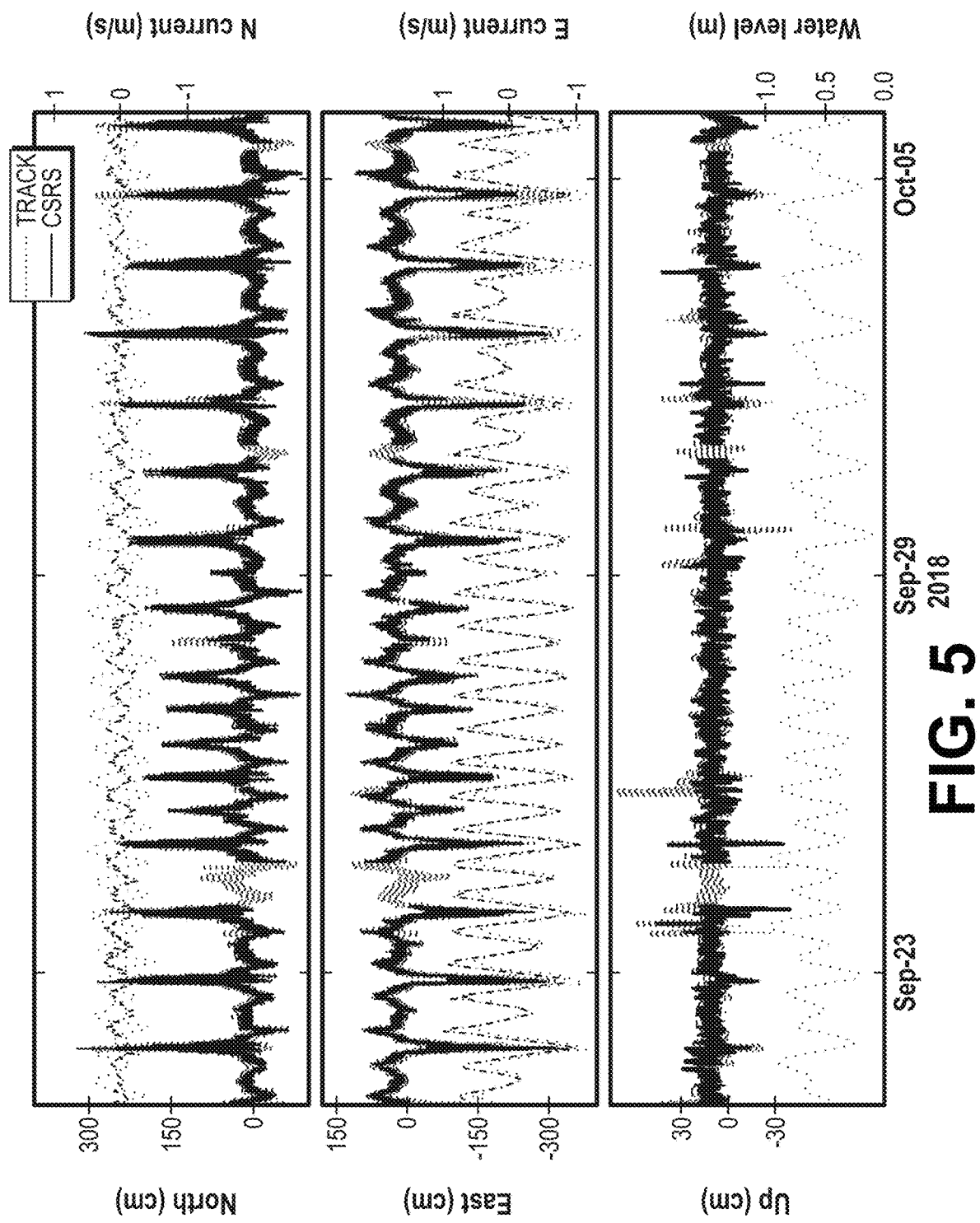
FIG. 5 illustrates example graphs of Global Positioning System (GPS) and oceanographic data, in accordance with various embodiments of the present disclosure.

Moving on to FIG. 5, shown are example graphs of GPS and oceanographic data. Black dots in FIG. 5 show the kinematic GPS positions processed using TRACK. Dots show solutions by CSRS for comparison. CSRS uses a precise point positioning (PPP) strategy and does not require reference stations. Solutions from these two processing streams show good agreement (FIG. 5), with relatively large differences mostly occurring when tidal current speed is high and tilt of the antenna is largest. These points are flagged as outliers (discussed below) and can be eliminated from position estimation of the seafloor marker 121. The CSRS-PPP tool can be used to fill gaps in TRACK results (e.g., gaps caused by outages at the reference station). FIG. 5 shows 15 days of GPS and selected oceanographic data. Except for a few outliers, solutions from these two software programs match well. Data gaps in TRACK solutions are mainly due to data gaps in the on-land reference station. Curves in the upper two panels show surface tidal current speeds from the nearby current meter shown in FIG. 1B, blue curves show the Tampa Bay Coastal Ocean Model (TBCOM) hindcast surface current speeds at the GPS-buoy location. GPS motion is positively correlated with current velocity (the linear correlation coefficient between GPS displacement and modeled current speed is 0.56 for the north component and 0.80 for the east component).

The disclosed systems and methods can also provide magnetic correction for a sensor module 115 that experiences one or more biases. The sensor module 115 can include three magneto-resistive sensors oriented in orthogonal directions plus a 2-axis fluid tilt sensor. The sensor module 115 can obtain at least one measurement including tilt-compensated heading, pitch, and roll data. In some embodiments, the HMR3000 from Honeywell™ International Inc. can be used as the sensor module 115. Keeping the tilt sensor level can provide certain advantages, such as those described in the data sheet for the HMR3000. Although the sensor module 115 can update continuous data with a frequency up to 8 Hz, fast jarring of the sensor can degrade pitch/roll measurements and affect tilt compensated headings because not all the fluid can immediately return to the bottom of the tilt sensor's glass ampoule. Therefore, accuracy of the heading, pitch, and roll measurements can be reduced when pitch or roll are large.

Figure 6:
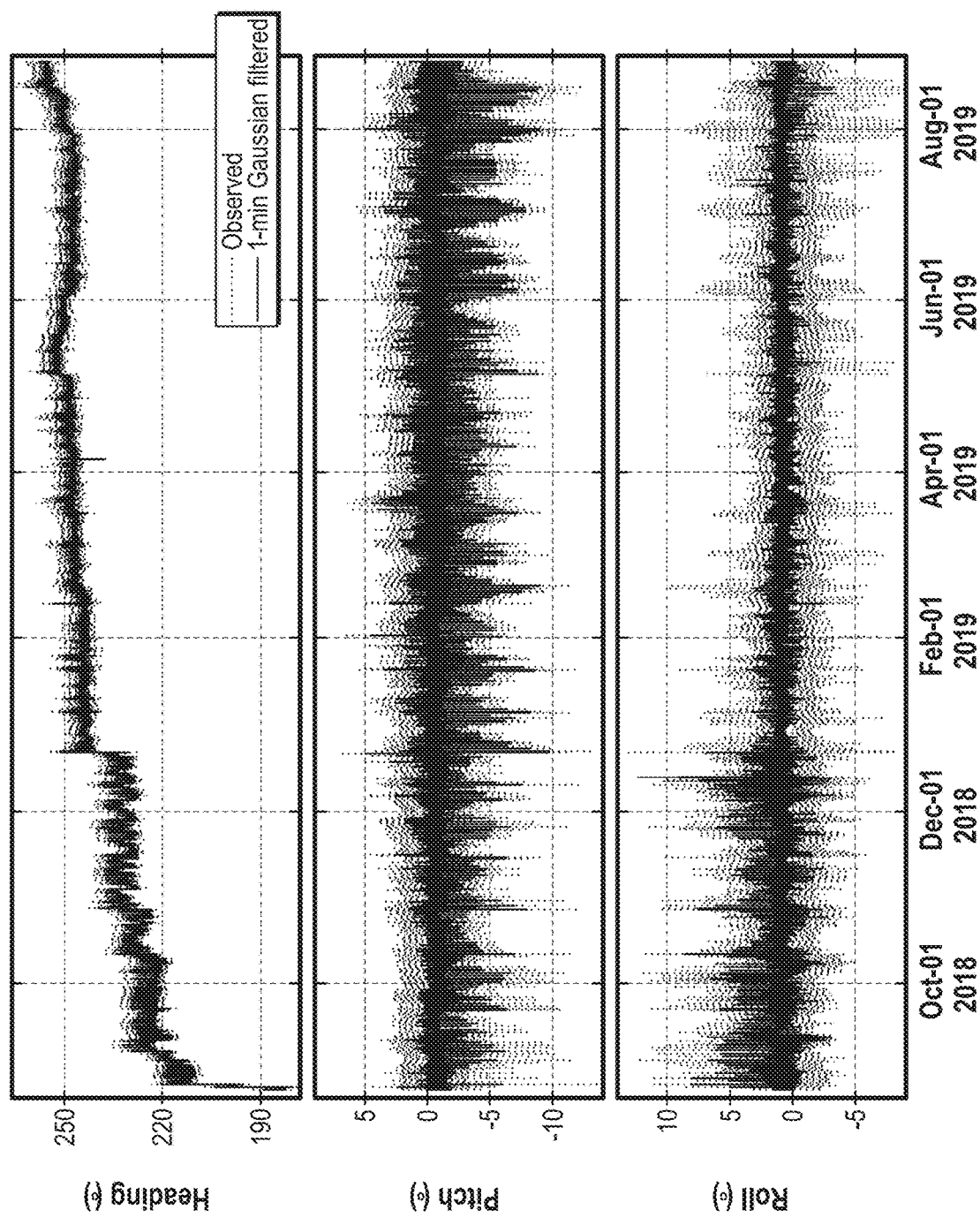
FIG. 6 illustrates example graphs of heading, pitch, and roll measurements over a sampled time period, in accordance with various embodiments of the present disclosure.

FIG. 6 illustrates example graphs of heading, pitch, and roll measurements over a sampled time period, where example outputs from the sensor module 115 are shown. FIGS. 7A-7D illustrate examples of heading offset and anchor position estimates for a particular date. During the observation period, pitch/roll measurements are all within ±20° and mostly ±5°. With this range, the nominal repeatability for a heading measurement should be ±0.3°, while pitch and roll measurements should be ±0.2° for one or more sensor modules 115 from some manufacturers. It can be assumed that within a short period (e.g., <1 minute in some cases) the buoy 103 moves smoothly, and a 1-minute Gaussian filter can be used to smooth heading, pitch, and/or roll measurements. Lines in FIG. 6 show smoothed data. Dots are observed time series. Data can be smoothed using a 1 minute (13 data points window) Gaussian filtered time series. See FIG. 7B, discussed below, for example data in 1 day. This smoothing can significantly reduce the scatter of heading, pitch, and roll observations. The present systems and methods can correct magnetic declination using the World Magnetic Model WMM2015v2 (available at https://www.ngdc.noaa.gov/geomag/WMM/soft.shtml#downloads), which is about −5.4° during the observation period at the GPS-buoy location. Thus, heading data presented here are relative to geographic north.

While pitch/roll measurements are controlled by the force of gravity on fluid in a tilt sensor of the sensor module 115, heading measurements represent changes of orientation of the buoy 103, and are sensitive to the local magnetic environment and its changes. Therefore, variation of local magnetic environment (e.g., caused by orientation of the superstructure 106) can induce offset in the heading measurements. Thus, heading output from the sensor module 115 may be offset from the true heading direction. Leaving this offset uncorrected could impart a significant systematic error to the tilt correction, affecting the precision and accuracy of the horizontal component estimates for the seafloor marker 121. In order to avoid this bias, corrections such as the following can be applied.

It can be assumed that for a short period (e.g., 1 day), offset in the heading measurement is constant, and the seafloor marker 121 is stationary or moves linearly. Offset of the heading measurement can be estimated by minimizing the weighted one standard deviation (SD) of anchor position residuals. As mentioned above, outputs from the sensor module 115 can be less accurate when the tilt angle is large. GPS solutions are also noisy when pitch or roll is large (see dots in FIG. 7A, corresponding to periods of high-speed tidal currents). The data that indicates either pitch or roll exceed 2° in any direction can be masked out. A grid search with a step width of a resolution of the measurements of the sensor module 115 (e.g., 0.1°) can be used to estimate the heading offset. Black dots in FIG. 7C show position time series of the seafloor marker 121 for a typical day with estimated heading offset corrected, and show considerable improvement.

Figure 7A:
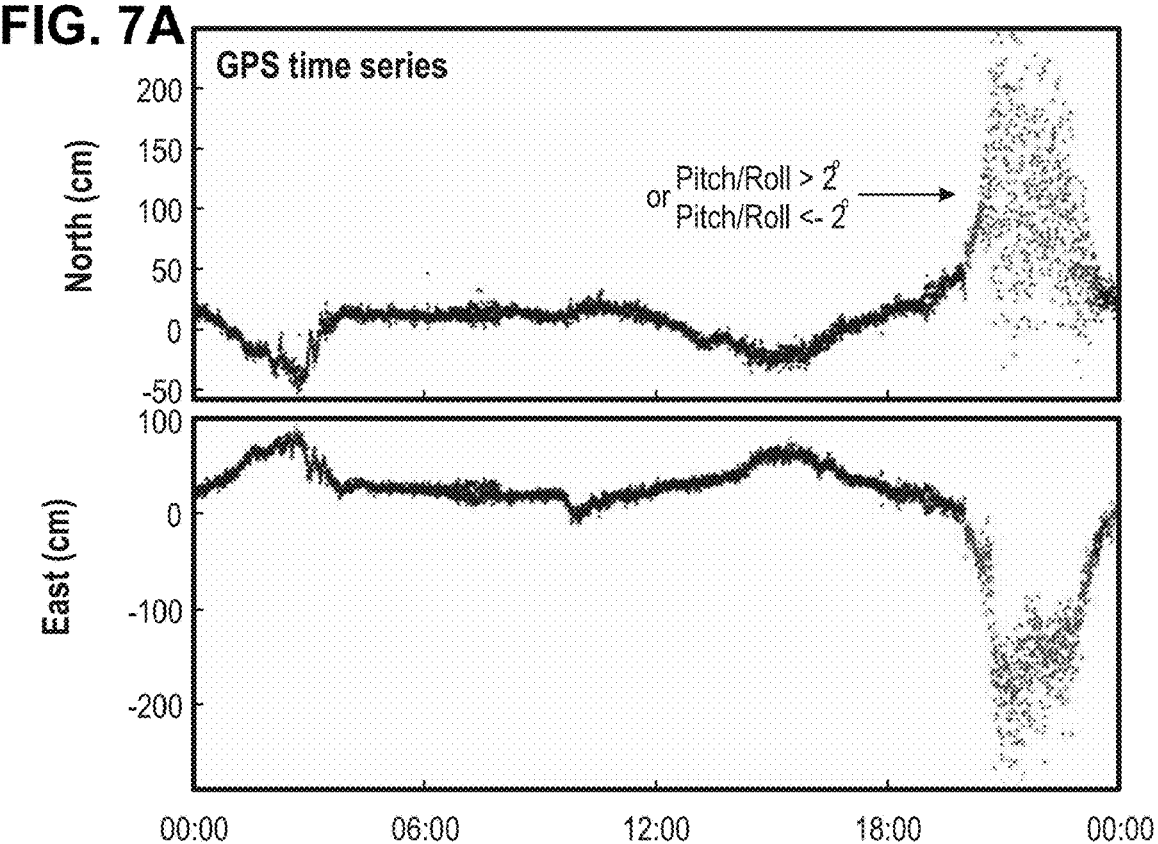
FIGS. 7A-7D illustrate examples of heading offset and anchor position estimates for a particular date, in accordance with various embodiments of the present disclosure.
Figure 7B:
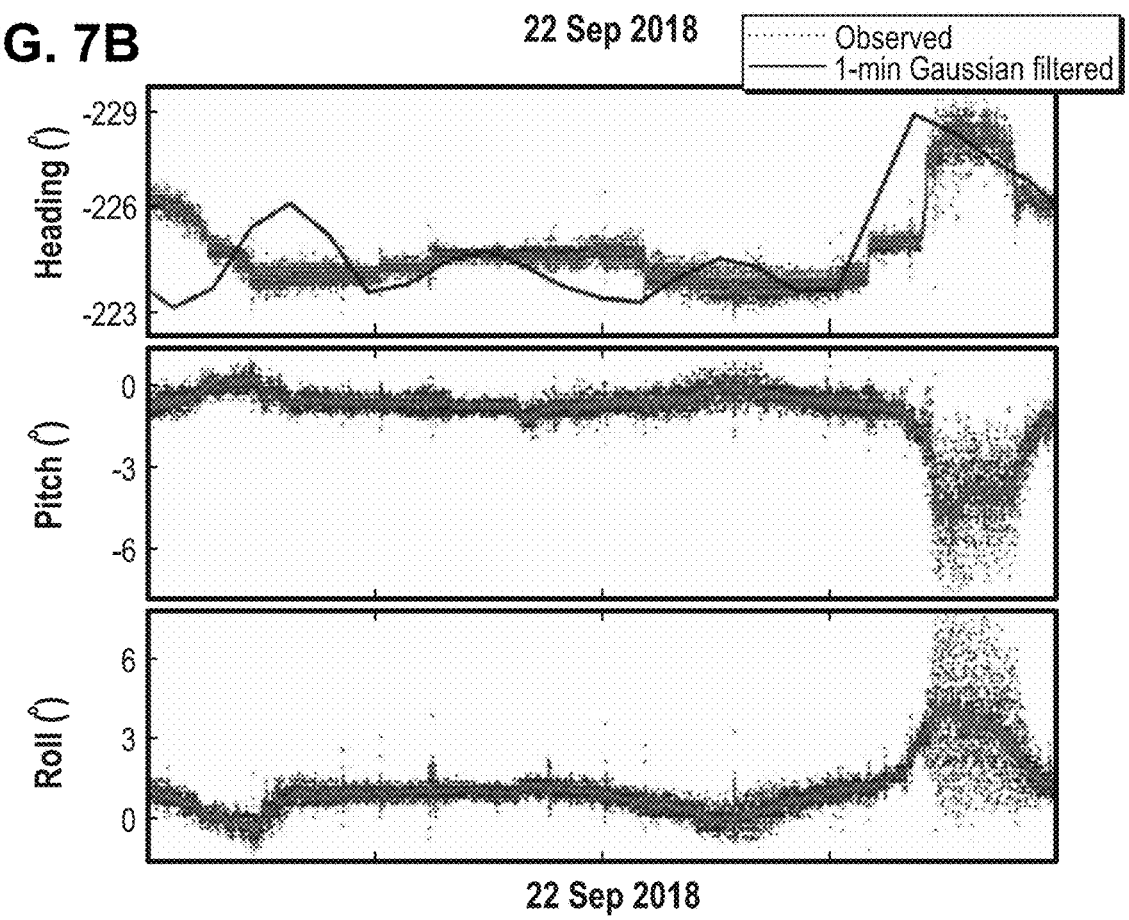
Figure 7C:
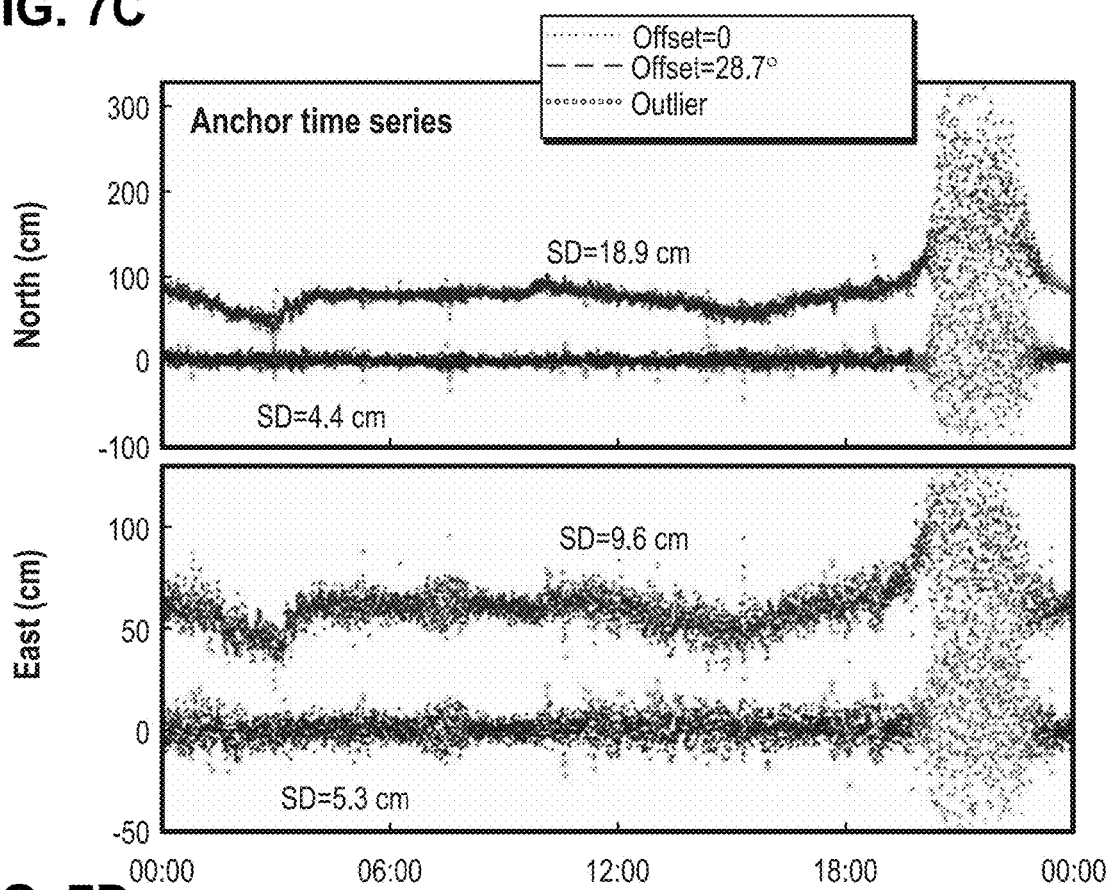
Figure 7D:
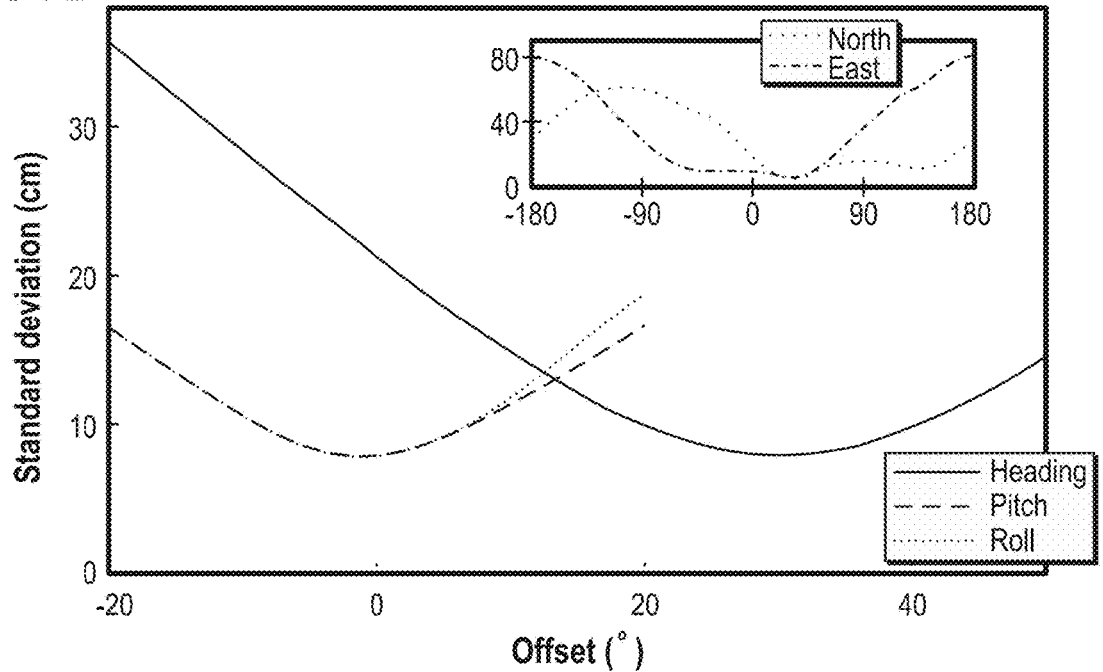

Referring still to FIGS. 7A-7D, these figures show heading offset and position estimates of the seafloor marker 121 for 22 Sep. 2018. FIG. 7A shows north/east components of GPS time series, red marks data when pitch or roll measurements are >2° or <−2°. FIG. 7B shows heading, pitch, and roll measurements. Note due to the 0.1° resolution of the sensor module 115, these observations have small step changes around the Gaussian filtered time series. Large pitch/roll are observed when current speed is high. FIG. 7C shows calculated positions using heading data corrected for magnetic declination. Some of the black dots show calculated positions by adding an offset to heading data (magnetic declination corrected) that minimizes scatter of one day positions of the seafloor marker 121. FIG. 7C also shows pitch or roll exceeding 2°, with some of the dots showing outliers that are detected. Weighted one standard deviation (SD) for north and east components are shown. Note that in some embodiments different offsets in heading do not affect estimates of the vertical component, so the vertical positions are not shown here. FIG. 7D shows weighted one standard deviation (root of the sum square of north and east components) when adding different offsets to measurements of the sensor module 115 for 22 Sep. 2018. The inset of FIG. 7D shows for a wider range of heading offset, units of X and Y axes are the same as the main view of FIG. 7D.

Figure 8A:
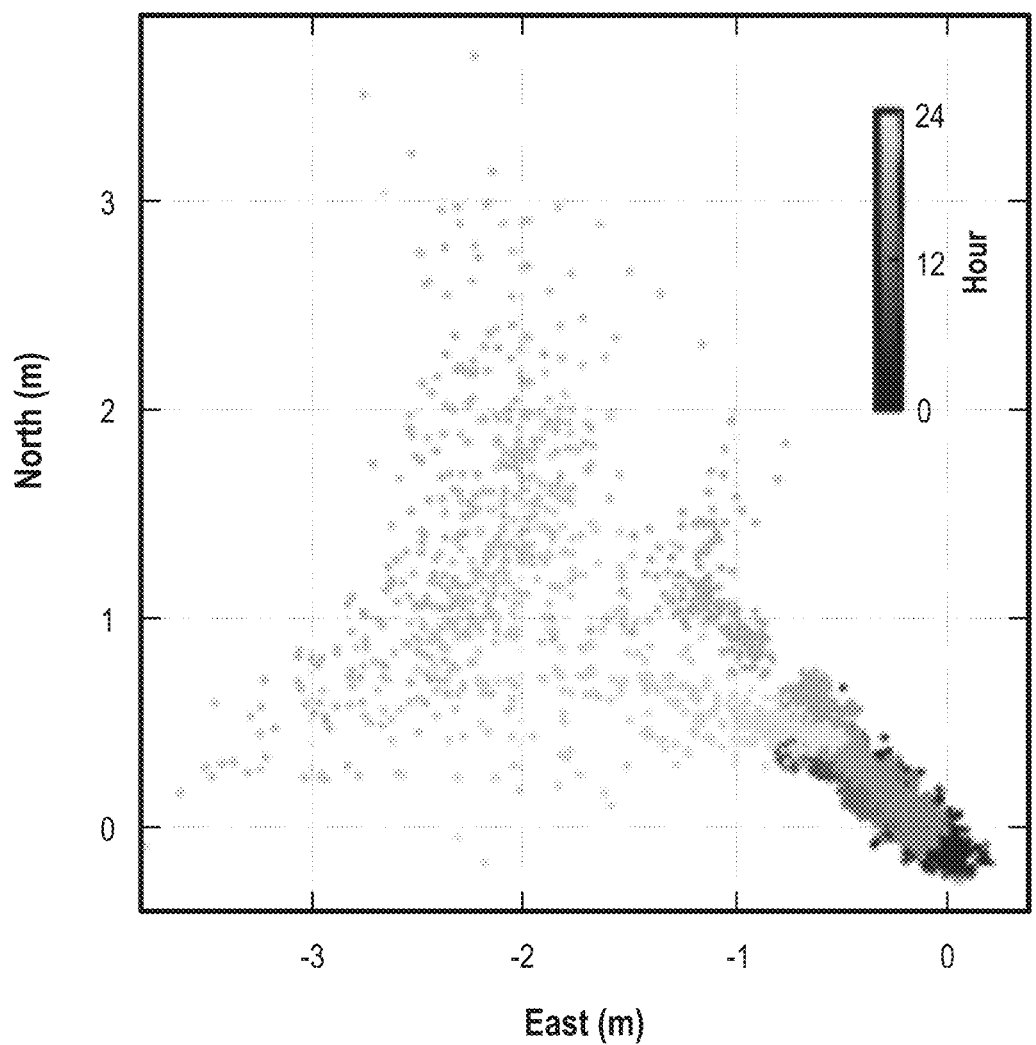
FIGS. 8A-8C illustrate examples of GPS and estimated anchor positions for a single day, in accordance with various embodiments of the present disclosure.
Figure 8B:
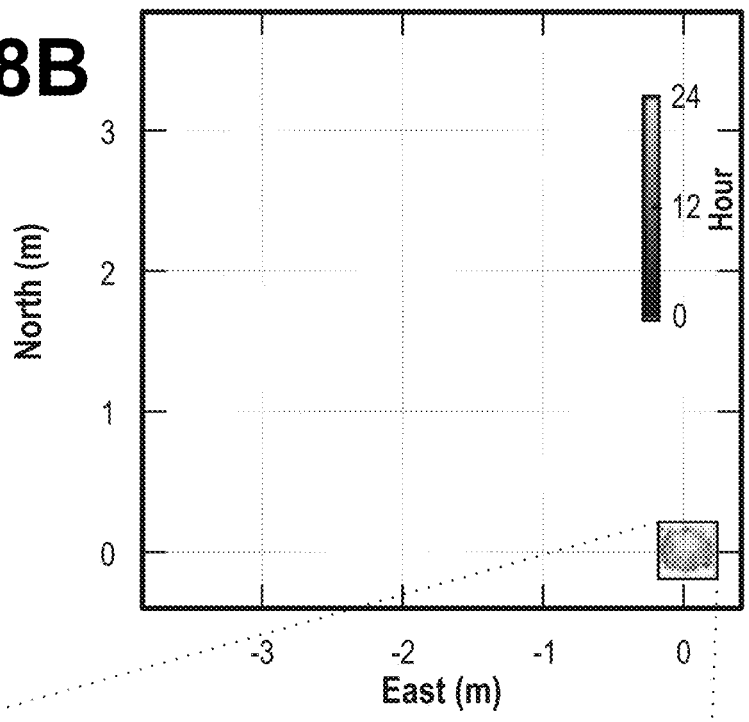
Figure 8C:
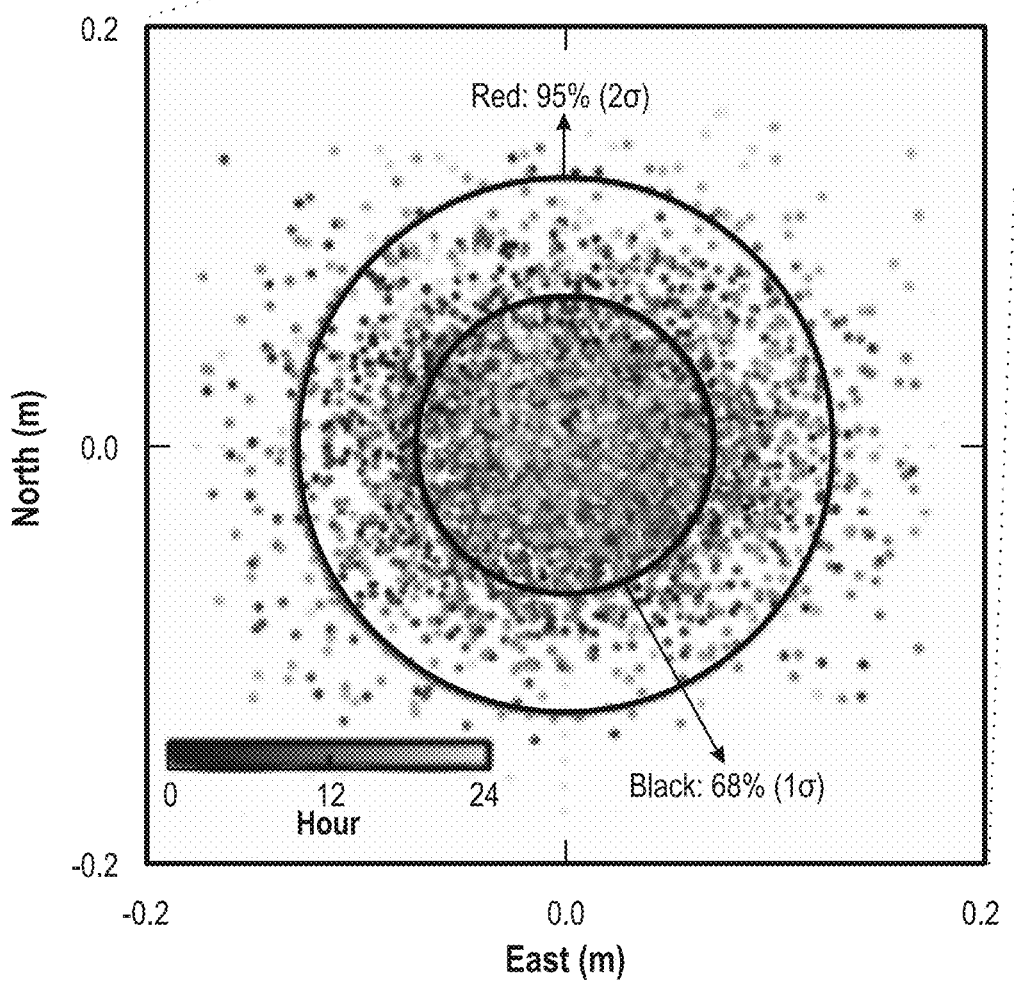

FIGS. 8A-8C show plan views of GPS and estimated position of the seafloor marker 121 for a single day (22 Sep. 2018). For comparison, dots in FIG. 7C show position time series assuming no instrumental offset for the sensor module 115. Note that a modified Z-score method can be applied to detect outliers in position estimates of the seafloor marker 121 for a session. For a given period, Z-score of the i-th position estimate x; for the seafloor marker 121 can be:

$$Z_i = 0.6745 |x_i - \tilde{x}| / \text{MAD} \quad (6)$$

where $\tilde{x}$ is the median value of all position estimates during the period and MAD denotes the median absolute deviation:

$$\text{MAD} = \text{median}(|x - \tilde{x}|) \quad (7)$$

with x denoting a list of all position estimates during the period. A threshold Z-score of 3.5 can be set. Any of the north/east/up components with Z-scores exceeding this value are considered outliers and removed. Dots in FIG. 7C show detected outliers for the example day.

The pitch/roll measurements do not normally have significant offsets since they use a gravitational reference. Possible corrections to these measurements were tested using the same method as for heading offset, but the estimates are mostly within ±0.2° of the measured values (FIG. 7D shows an example). Thus, no offset in pitch/roll measurements can be assumed. Possible residual errors related to measurement of heading, pitch, or roll can also be analyzed.

As depicted in FIGS. 8A-8C, FIG. 8A shows a GPS position time series. FIG. 8B shows estimated positions for the seafloor marker 121. The box in FIG. 8B outlines an area shown in FIG. 8C. In FIG. 8C, circles mark 68% (7.1 cm) and 95% (12.8 cm) percentages of the distances from the daily median position. Note that FIG. 8A and FIG. 8B depict the same spatial scale. FIG. 8C is a close-up of the outlined box in FIG. 8B.

Figure 9:
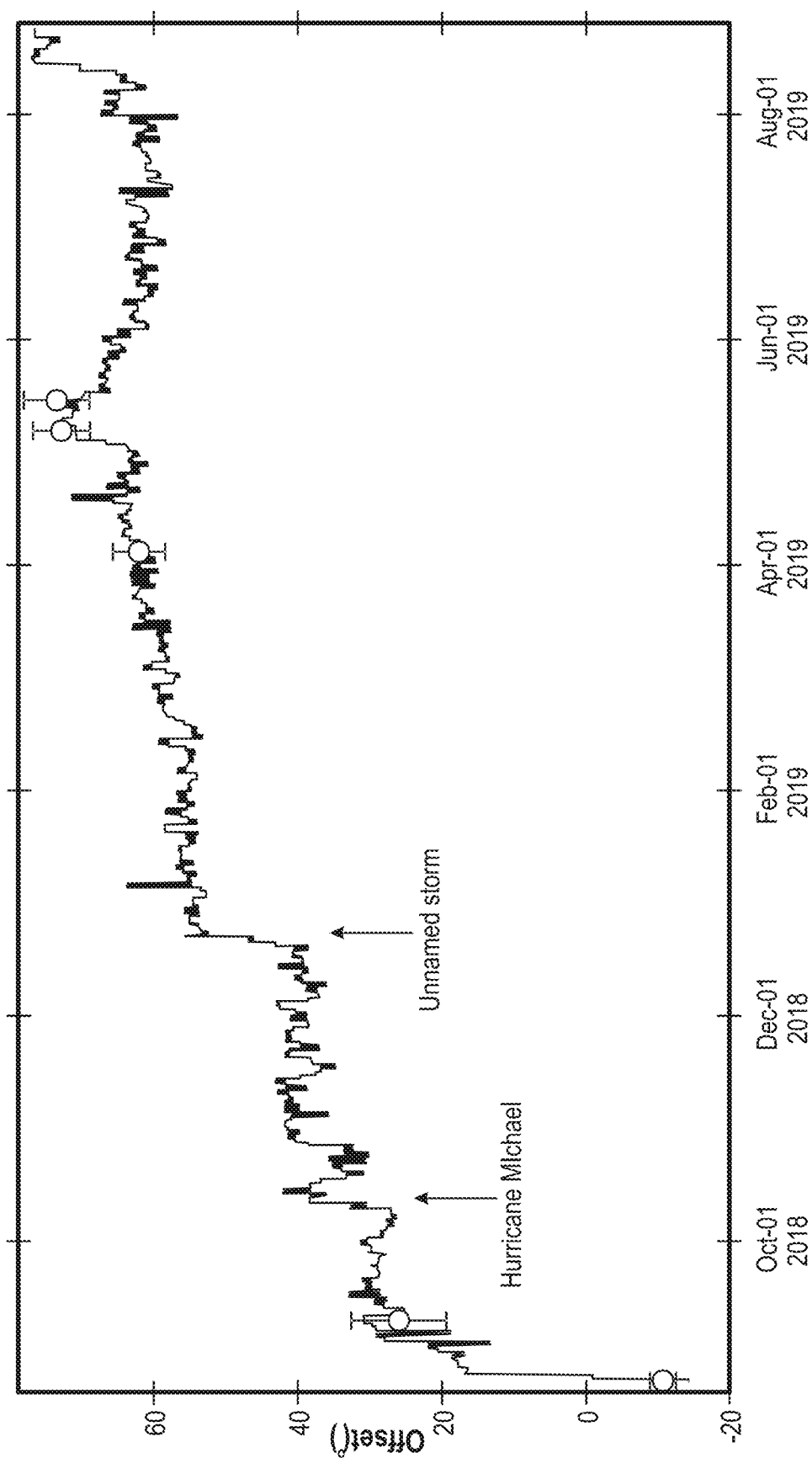
FIG. 9 illustrates an example of a graph of heading offset variations, in accordance with various embodiments of the present disclosure.

Moving on to FIG. 9, shown is an example of a graph of heading offset variations. The black line in FIG. 9 shows the estimated heading offset (modeled as a compass forward axis azimuth direction minus compass measured heading, or a constant offset for each session) during the entire observation period. The estimates can be determined by reducing daily anchor displacements (see, e.g., FIG. 7C), shown with daily increments. Dots with error bars (2σ) are estimates using the inverse perspective transformation method. Except for days with flagged jumps, they are shown with daily increments. Note that there are considerable changes in the first few months, some of which are caused by rapid re-orientation of the buoy 103 as it settled to a stable position, as well as a step change associated with a major unnamed storm around Dec. 20, 2018.

The validity of the heading correction technique was tested using an independent estimate based on optical image analysis. While such an analysis may not be possible in most offshore locations, it is useful here as a check on the least squares estimation procedure described above. The image analysis uses an inverse perspective transformation (done with OpenCV-Python module) of photographic images taken from a boat or an Unoccupied Aerial Vehicle that includes the buoy 103 and known points on nearby Egmont Key. The thin bars of the superstructure 106 are parallel or perpendicular to the forward direction (origin direction for heading measurements, shown by dashed arrow in FIG. 4A) of the sensor module 115. Their orientations are used to construct parallel lines that intersect at a vanishing point (estimated using the least squares procedure) in a camera perspective projection. The buoy-water surface contact and the vanishing point thus form a line that is parallel to the forward direction of the sensor module 115. The orientation of its projection can be estimated using the georeferenced image. Using this method and multiple images taken during each site visit, variation of the offset in heading measurements can be estimated. Dots and error bars in FIG. 9 represent the mean and two standard derivation of estimates for each visit. This approach yields results that are consistent with the heading offset estimation procedure described above using the least squares estimation procedure. Large changes in heading offset occurred in the first month after deployment, as well as several days of extreme weather.

Figure 10A:
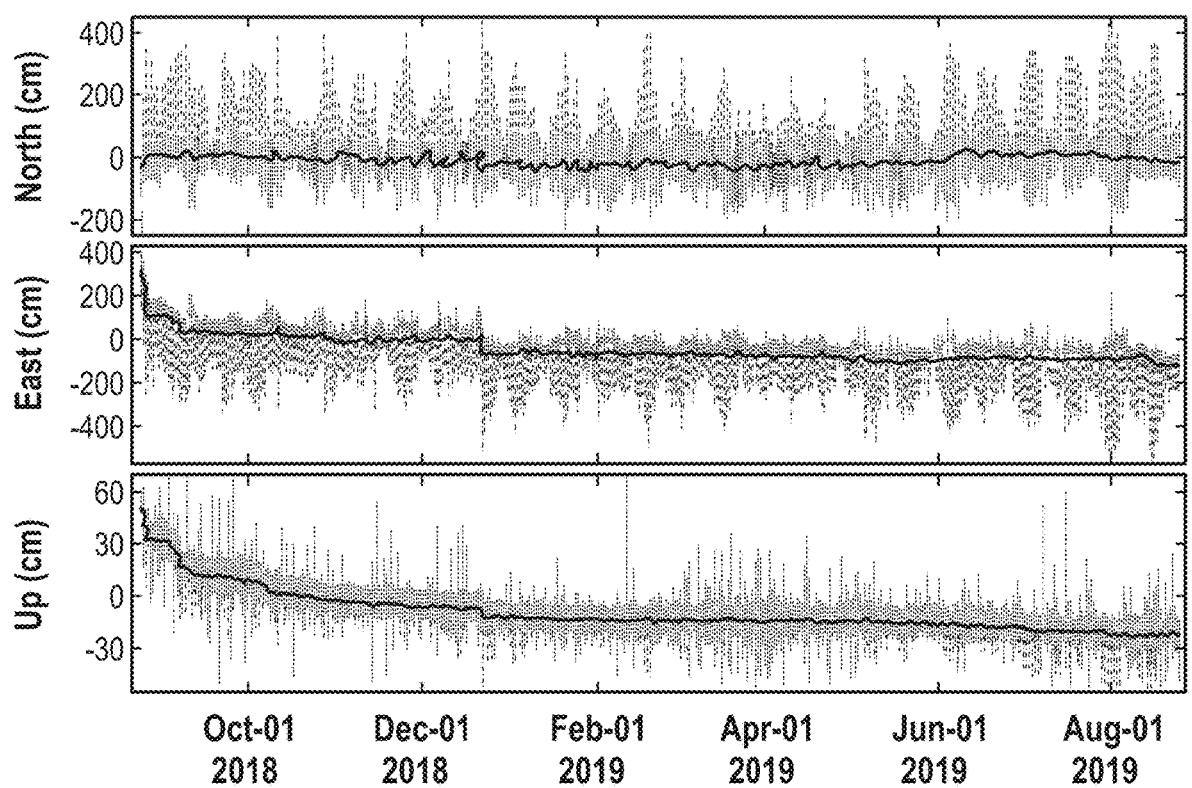
FIG. 10A illustrates an example of a top of buoy position, in accordance with various embodiments of the present disclosure.
Figure 10B:
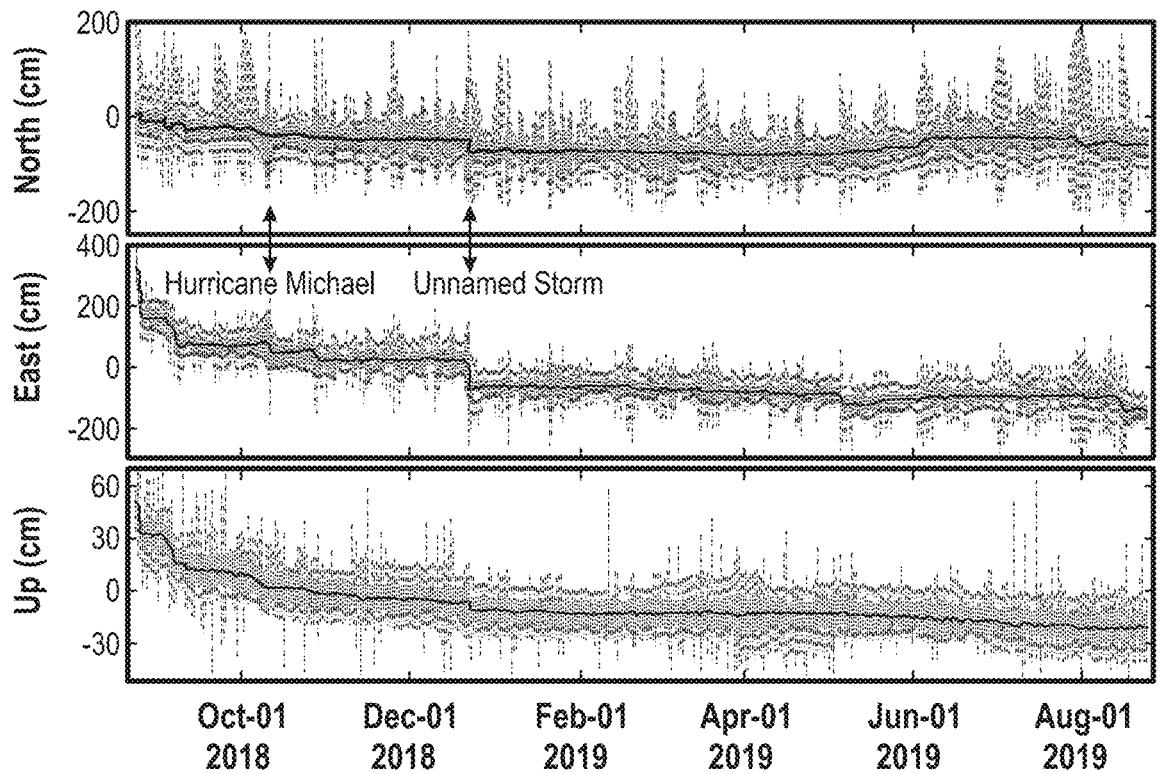
FIG. 10B illustrates an example of an anchor position, in accordance with various embodiments of the present disclosure.
Figure 10C:
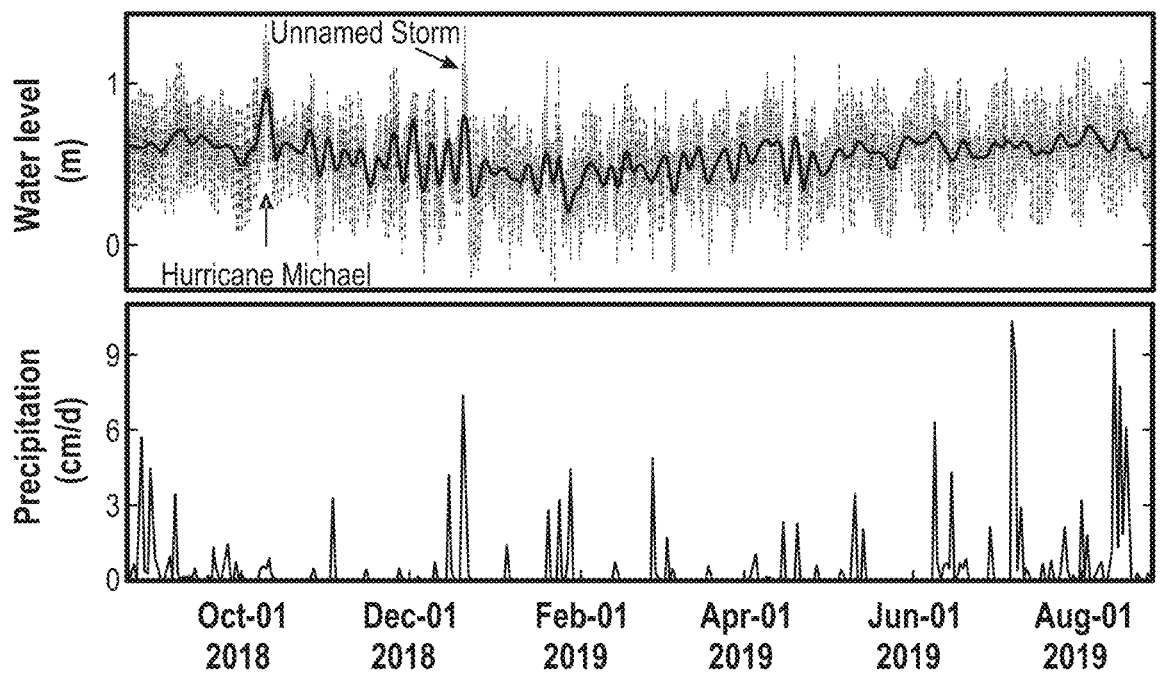
FIG. 10C illustrates an example of environmental data, in accordance with various embodiments of the present disclosure.
Figure 11A:
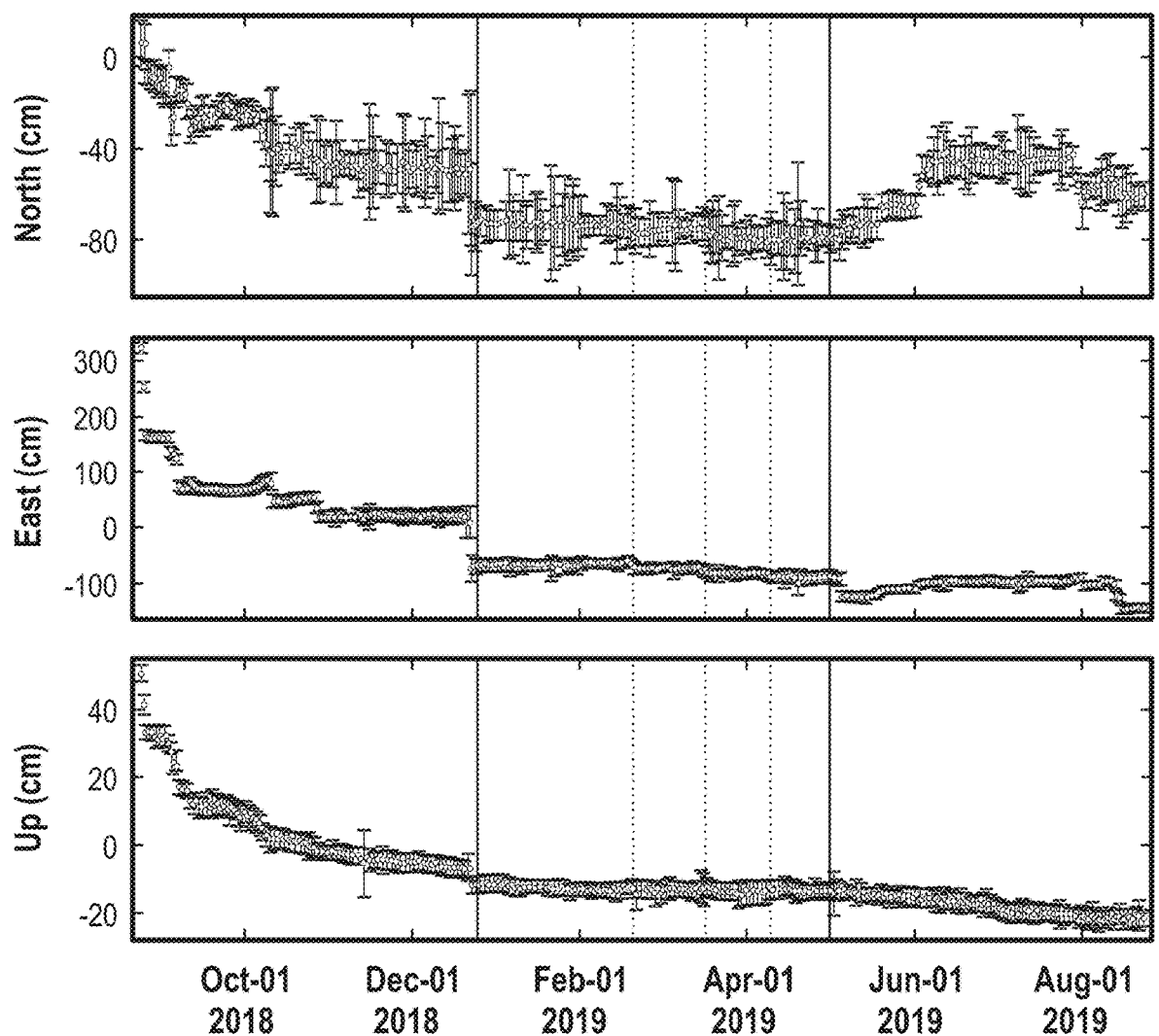
FIGS. 11A and 11B illustrate examples of anchor displacement estimates, in accordance with various embodiments of the present disclosure.

The disclosed systems and methods can therefore determine a position of the seafloor marker 121. The estimated heading offsets can be applied and equations (1) to (5) can be used to recover positions of the seafloor marker 121 for the entire period. FIG. 10A illustrates an example of a position of a top of the buoy 103, and shows the full period of the observed GPS time series for the position of the top of the buoy 103. FIG. 10B illustrates an example time series for the corresponding position of the seafloor marker 121, with 15-second intervals in dark grey, and daily median time series. The median position of each day can be used as an estimate, and the weighted one standard deviation (SD) can be used as a measure of uncertainty (1a) for each day. Daily solutions and uncertainties are shown in FIG. 11A. During the first month after deployment, the system experienced rapid horizontal motion of several meters and vertical subsidence of ~0.5 meter. In the next seven months, the seafloor marker 121 was relatively stable except for short perturbations associated with extreme weather. Large perturbations occurred due to the passage of Hurricane Michael (around Oct. 10, 2018) or during an extreme weather event with heavy precipitation (around Dec. 20, 2018) (FIG. 10C). During the following summer (June, July, August 2019) there were frequent extreme weather events (see precipitation data in example of environmental data depicted in FIG. 10C), causing significant motion of the seafloor marker 121. Several other large displacements occurred during periods of exceptionally high current periods. In general, long-term displacement of the seafloor marker 121 mimics long-term displacement of the GPS (FIGS. 10A, 10B), since the seafloor marker 121 constrains GPS position by a rigid connection.

Again, FIGS. 10A-10C depict the position of the top of the buoy 103 in FIG. 10A, a position of the seafloor marker 121 in FIG. 10B, and selected environmental data in FIG. 10C. In FIG. 10A, dots show GPS positions when both pitch and roll measurements are between −2° and 2°. Dots also show when pitch or roll exceed ±2°. Further, dots show daily medians from the data. In FIG. 10B, dots show using data when both pitch and roll measurements are between −2° and 2°, some of the dots correspond to some of the dots in FIG. 10A. Also, some of the outliers are detected and shown as light dots. Daily medians from the data are also shown. In FIG. 10C, water level and precipitation records are shown for a location near the test site. One curve shows observed water level (location of tide gauge shown in FIG. 1$i$). Another curve shows 0.2 cycle-per-day low-frequency-pass filtered water level. In the lower panel, precipitation data are daily accumulated records (location of station shown in FIG. 1).

Figure 11B:
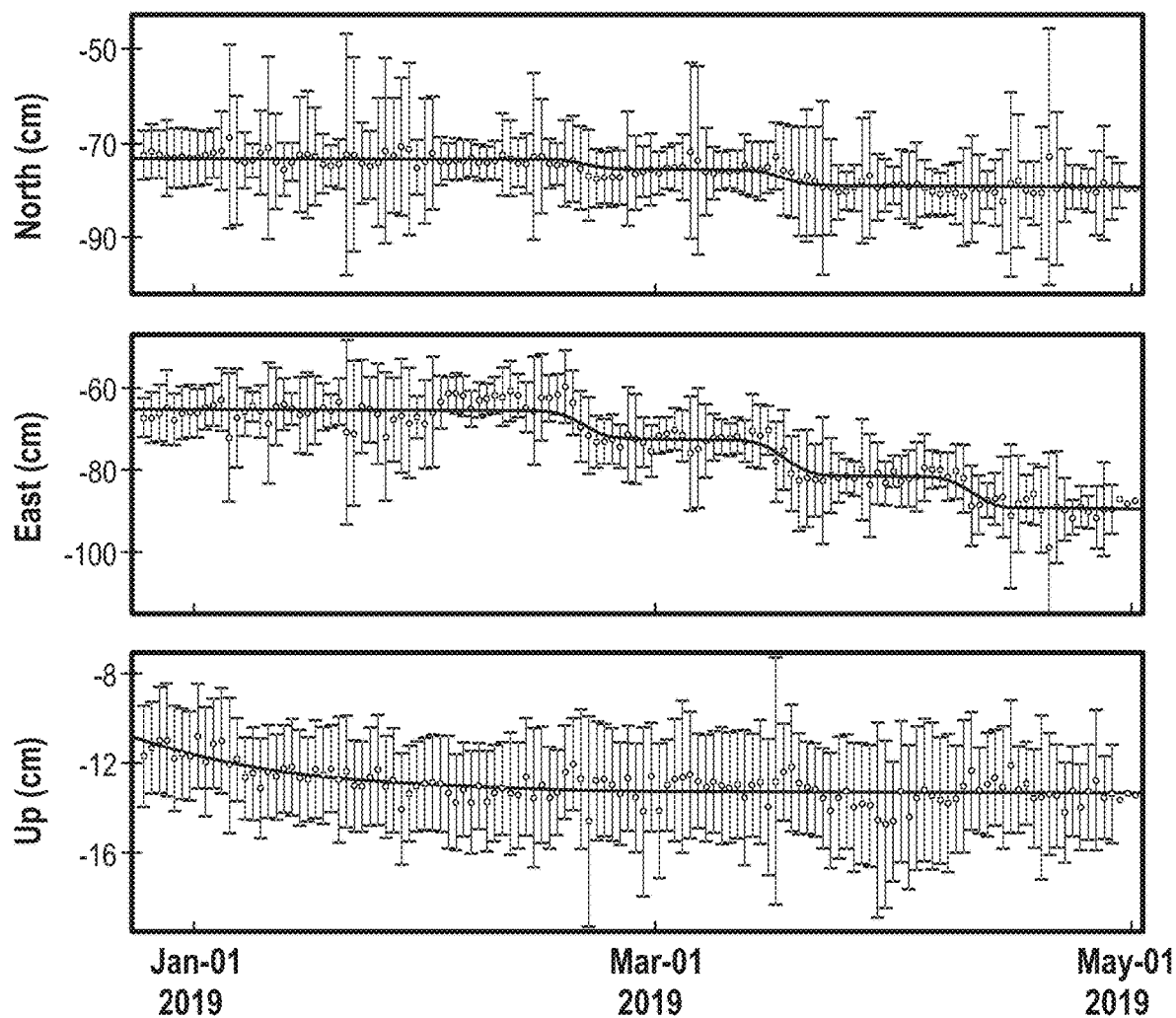

FIGS. 11A and 11B illustrate examples of displacement estimates of the seafloor marker 121. To assess the repeatability of seafloor marker positioning using the disclosed system, the time series for the ~5 month period from 25 Dec. 2018 to 1 May 2019 (FIG. 11B) was analyzed. The displacements are modeled as simple functions, then the standard deviation can be computed to assess repeatability. The vertical position of the anchor can be modeled as exponentially decreasing subsidence. The horizontal position components of the anchor are assumed to behave linearly with near-zero velocity, except for several discrete steps. Displacements can be modeled following the approach described by Larson et al. (2004) in "Crustal deformation measurements in Guerrero, Mexico. *J. Geophys. Res.*, 109, B04409, doi:10.1029/2003JB002843":

$$x(t_i) = A + Be^{Ct_i} + \sum_{k=1}^{n} \frac{D_k}{2}\left(\tanh\frac{t_i - T_k}{\tau_k} - 1\right) \quad (8)$$

where $x(t_i)$ is the position estimate of the seafloor marker 121 at time $t_i$. A, B, C, and $D_k$ are parameters to be estimated. $D_k$, $T_k$, $\tau_k$ are the displacement, middle time, and duration half width of the k-th transient events respectively. Horizontal displacements occurred in three discrete events (as shown in Table 1).

TABLE 1

Modeled horizontal displacements during three discrete events.

| Time | North disp. (cm) | East disp. (cm) |
| --- | --- | --- |
| 2019 Feb. 19 | −2.4 ± 0.4 | −7.2 ± 0.6 |
| 2019 Mar. 17 | −3.6 ± 0.4 | −9.1 ± 0.8 |
| 2019 Apr. 10 | −0.3 ± 0.4 | −8.0 ± 0.8 |

One can set B=0 for horizontal components assuming settling-related displacement is trivial in horizontal displacements during the selected period, and set $D_k$=0 for the vertical component assuming transient event related displacement is insignificant during the selected period. Values for $T_k$ and $\tau_k$ can be visually inspected. Lines in FIG. 11A mark the selected period shown in FIG. 11B. Dashed lines in FIG. 11A mark selected transient events modeled in equation (8), chosen by visual inspection. Curves in FIG. 11B show best fitting curves to the daily time series. Weighted one standard deviation of the residual time series for each component can be used as a measure of repeatability. For horizontal components, the standard deviation can be about 1-2 cm, and can be larger in the east-west direction, where tidal current amplitude is much larger than in the north-south direction (FIG. 5). For the vertical component, the standard deviation can be less than 1 cm. The horizontal component repeatability of the disclosed system can be about 10 times larger than a nearby land site (1.4 mm), while the vertical component repeatability can be at a similar level (4.8 mm). In FIGS. 11A and 11B, dots are session medians (mostly daily except for interrupted sessions), with 1σ uncertainties shown by bars. FIG. 11A shows a time series of the entire analyzed period. Solid lines mark the period shown in FIG. 11B. Dashed lines mark three slip events modeled in FIG. 11B. In FIG. 11B, a time series for the period 25 Dec. 2018 to 1 May 2019 is shown. Curves are best fitting curves using equation (8). Weighted one standard deviation (SD) of model residuals during this ~5 month period is calculated to assess repeatability.

Figure 12A:
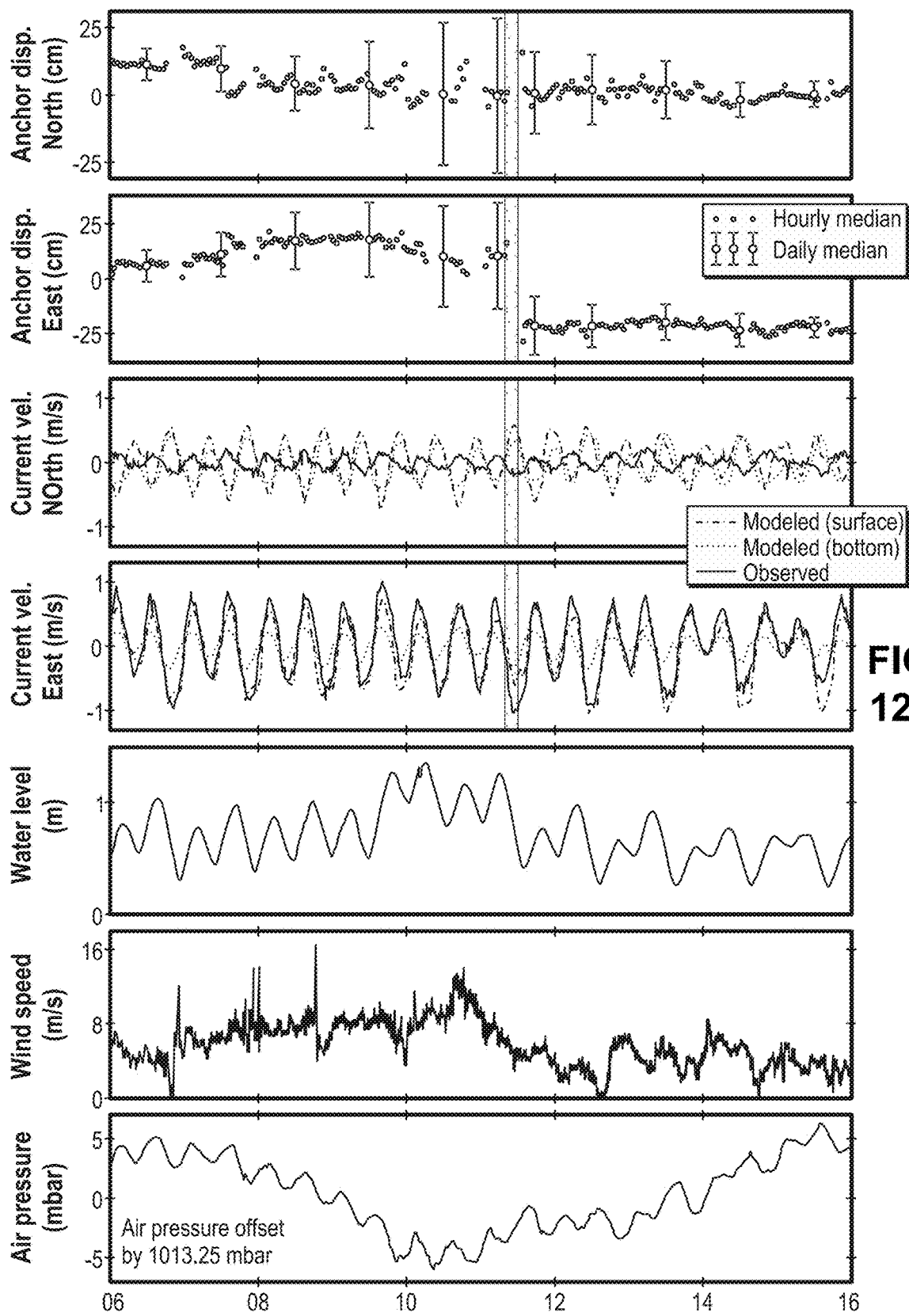
FIGS. 12A and 12B illustrate examples of anchor displacement and environmental variables during various storms, in accordance with various embodiments of the present disclosure.
Figure 12B:
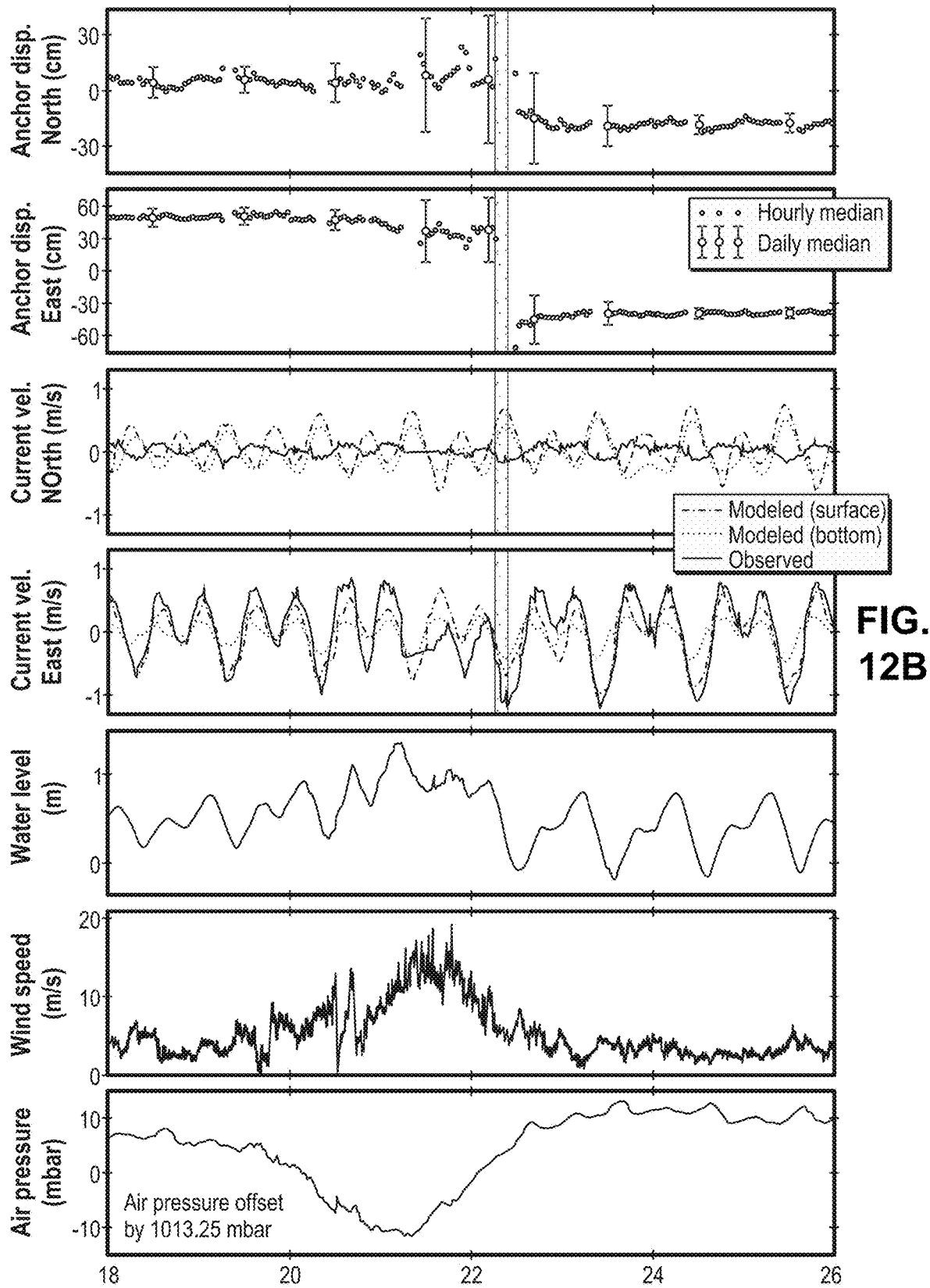

In FIGS. 12A and 12B, seafloor marker 121 displacement and environmental variables during Hurricane Michael (FIG. 12A) and an unnamed storm in December 2018 (FIG. 12B) are shown. Water levels were observed at the site shown by the orange square in FIG. 1B. Currents are the Tampa Bay Coastal Ocean Model (TBCOM) hindcast at the GPS-buoy site. Observed currents were recorded by a current meter shown by the pentagon in FIG. 1B. Wind speed and air pressure data were observed at the meteorological station shown by triangle in FIG. 1B. Note that shade marks the time of large displacement when current speed is at local maximum.

Further Discussion

Error sources for the anchor position estimates can include two types: 1) GPS measurement and processing errors, and 2) 3-dimensional transformation errors due to input parameter errors, e.g., errors in ($N_{ag}$, $E_{ag}$, $U_{ag}$) using equation (2). There can be loose constraints on the GPS data processing (e.g., GPS motion can be modeled as a random walk and allow all three components to move up to 1 meter per second). The solutions from TRACK and CSRS show good consistency. The formal errors in TRACK outputs are typically 1.5-2.0 cm for horizontal components and 4-5 cm for vertical components, comparable to other kinematic GPS applications. Potential errors associated with 3-dimensional transformation in equation (2), which are likely to be a dominant error source, are analyzed below.

In equation (2), it was assumed that the GPS 112 and the seafloor marker 121 are perfectly on a line that crosses the long axis of a rigid buoy 103, therefore the seafloor marker 121 coordinates in a reference frame defined by the GPS 112 and three rotation axes (G-$X_b Y_b Z_b$ in FIG. 4A) were (0, 0, L). In reality, either GPS 112 or the pivot of the shackle 124 of the seafloor marker 121 may be located at a slightly biased position and L contains measurement error. That is, the seafloor marker 121 coordinates in G-$X_b Y_b Z_b$ are (p, q, L), where p, q, L represent point coordinates for the seafloor marker 121 along the roll/pitch/heading axes of the sensor module 115. Thus, there can be 6 parameters (p, q, L, $\alpha$, $\beta$, and $\gamma$) on the right side of equation (2). Errors in these parameters will be propagated to ($N_{ag}$, $E_{ag}$, $U_{ag}$). Assuming the 6 parameters are independent, one can rewrite equation (2) and take the partial derivatives of ($N_{ag}$, $E_{ag}$, $U_{ag}$). Some of the items can be ignored in the total error budget, some will counteract each other, and some will only cause a systematic error for all position estimates that will not affect displacement estimates. One can ignore terms where more than two small values multiply together. For example, $\cos(\alpha)\sin(\beta)\sin(\gamma)\Delta p$ can be ignored because both pitch, roll, and $\Delta p$ are small values and the total contribution of the multiple is much less than 1 mm. Due to high nonlinearity, one can apply loose constraints and derive possible maximum errors in the seafloor anchor position. For example, $\cos(\alpha)$ or $\sin(\alpha)$ should fall between $-1$ and 1, and they can counteract each other, so one can allow their absolute values to be 1 at the same time, thus the derived errors represent the maximum possible error. Among the possible amplitudes of anchor positioning errors, errors in heading measurements will not affect the vertical component of the anchor position estimates. An error in length L of the buoy 103 can result in a systematic error in the vertical component of the position of the seafloor marker 121, but will be consistent for all vertical component estimates, hence its influence on displacement estimates can be trivial. Note that thermal expansion may induce additional error in the length of the buoy 103, but is small compared to the overall error budget and could be largely eliminated using a temperature-dependent model. At the test area, daily mean water temperature change between summer and winter is less than 25° C. The thermal expansion coefficient for steel is about $1 \times 10^5$ m $m^{-1}K^{-1}$, thus thermal expansion-induced change in length of the buoy 103 is on the order of a few millimeters.

Assuming reasonable errors for initial coordinates (of the seafloor marker 121) in reference frame G-$X_b Y_b Z_b$ as 3/3/30 cm (e.g., p=±3 cm, q=±3 cm, $\Delta L$=±30 cm), and using the repeatabilities provided by a manufacturer of the sensor module 115 as errors for each heading, pitch, and roll measurement (e.g., $\Delta\alpha$=±0.3°, $\Delta\beta$=±0.2°, $\Delta\gamma$=±0.2°), the maximum possible errors caused by errors in p, q, L, $\alpha$, $\beta$, and $\gamma$ can be determined. For a single epoch, errors in horizontal displacement estimates are at the centimeter level, and well below 1 cm for the vertical component. The standard deviations calculated for selected periods in FIG. 11B are in approximate agreement with this theoretical analysis and hence are representative of the noise level in the daily displacement time series.

The response to environmental forcing can also be evaluated. The disclosed moored device 100 can rotate around the seafloor marker 121 under the forcing of periodic tidal currents. Except for rapid motion during the first month after deployment due to settling, and the exceptionally rainy summer of 2019, the seafloor marker 121 is relatively stable. Perturbations to position of the seafloor marker 121 occur mainly during extreme weather or periods of exceptionally high tidal current (FIGS. 10A-10C and 12A-12B).

For the GPS 112 and the sensor module 115, the most prominent signal can be the quasi-diurnal motion associated with ocean tides (FIGS. 5 and 7A-7D). Large pitch/roll values occur during high-speed current periods (FIG. 7B). FIGS. 8A-8C illustrate examples of GPS and estimated anchor positions for a single day. Most of the time the GPS phase center is located northwest of the estimated anchor position, indicating that outgoing tidal currents are stronger than incoming tidal currents. This reflects the geometry of Tampa Bay (FIG. 1), where fresh water from the Hillsborough River watershed adds to outgoing currents associated with the ocean tide. The geometry of the deep Egmont shipping channel focuses a direct outward tidal flow (jet) directly towards the buoy 103 and the northern end of Egmont Key as it exits Tampa Bay (FIG. 1i).

The seafloor marker 121 moved westward by several meters immediately after deployment. The largest displacement occurred during the first two days after deployment. After that, large displacements correlate with periods of extreme weather conditions (FIGS. 10A-10C and 12A-12B). The United States Geological Survey (USGS) coastal database shows the seafloor at the location of the seafloor marker 121 to be primarily sand-based (usSEABED database: https://coastalmap.marine.usgs.gov/js_map/national/usseabed/, also see FIG. 2B). A cavity (FIG. 3) at the bottom of the ballast was designed to minimize translation movements on such bottom types, which should give a friction coefficient (f) of ~0.7. Using a software mechanical model (e.g., Working Model®), and assuming a wind speed of 20-25 m/s plus an ocean flow speed of 1.1-1.8 m/s during extreme weather conditions (e.g., the unnamed storm around Dec. 20, 2018), motion of the seafloor marker 121 is unlikely if the seafloor marker 121 sits on a gentle slope (e.g., ballast tilt angle less than several degrees), due to a residual frictional force of $>1.0 \times 10^4$ N. Models with much lower friction (f=0.3) suggest that motion of the seafloor marker 121 is possible under conditions of high tidal current forcing. Additional modeling results suggest that a preferred site condition for the moored device 100 is a dense sand bed with a slope smaller than 5° and current speed less than 2 m/s.

FIGS. 13A, 13A1, 13B, 13B1, 13C, 13C1, 13D, and 13D1 illustrate examples of bathymetry from multibeam sonar surveys showing bottom changes after deployment of the moored device 100. Hillshade maps (FIGS. 13A, 13B, 13C, and 13D) are illuminated by a light source from the west (azimuth angle is 270°, clockwise from north), with an elevation angle of 30°. Annotations on the lower right of (FIGS. 13A, 13B, 13C, and 13D) show dates of surveys. Details of the outlined box are shown on the right column. In FIGS. 13A1, 13B1, 13C1, and 13D1, background maps show relative heights with bars represented deeper to shallower represented, and dots showing daily median estimate of anchor positions with bars representing various aspects (e.g., located at the bottom of (FIG. 13D1)). In FIGS. 13B1, 13C1, and 13D1, dots show 15-second interval GPS positions on corresponding days, and centers of "+" mark position estimates of the seafloor marker 121 for corresponding days. Note that the bathymetry artifact in FIG. 13C is due to waves caused by ship turning, and pixels in FIGS. 13B1, C1, and D1 are data gaps due to low density of valid sounding measurements. All maps are in the same local reference frame. The multibeam dataset used to choose the seafloor marker 121 location from April 2018 was collected with a Reson SeaBat T50-R dual-head 200 kHz-400 kHz system, run at 400 kHz. The September 2018 dataset was collected with a Reson SeaBat 7125, also run at 400 kHz. All following multibeam datasets were collected with the Reson SeaBat T50-R dual-head run at 400 kHz.

At the test site, current-induced scour changes conditions at the seafloor marker 121 and is the most likely cause of the displacements. The left column of FIG. 13 (FIGS. 13A, 13B, 13C, and 13D) shows hillshade maps of the GPS-buoy site derived from multibeam sonar surveys. Large troughs formed near the seafloor marker 121, probably contributing to instabilities of the seafloor marker 121. The bathymetry data derived from multibeam surveys have grid sizes of 0.25-0.5 m, depending on the density of sounding measurements. Geolocations of these bathymetry maps (with MarineStar) have an accuracy of about 0.1 m. Comparison of multibeam sonar soundings of the seafloor marker 121 in the 27 Sep. 2018 surface to the 20 Mar. 2019 surface shows a southwestern displacement of 1-2 m, consistent with the position estimates for the seafloor marker 121 using the disclosed system.

Diver observations on Oct. 1, 2019 support this view. They show the seafloor marker 121 sitting in a 1 meter deep scour hole, with a gap at one corner between the base of the seafloor marker 121 and the sediment-water interface. This suggests that the seafloor marker 121 periodically shifts after periods of high current speeds and scour activity, settling into a new position as scour activity changes the local slope beneath the seafloor marker 121.

Some applications of the moored device 100 would not involve locations in a tidal channel, so these kinds of perturbations would not likely occur. For applications where high tidal current speeds are expected, modification of the ballast design may be beneficial.

The disclosed systems and methods are complementarity to existing seafloor geodesy methods. Several methods have been developed to measure seafloor motion, including: 1) bottom pressure, 2) GPS-acoustic, 3) direct-path acoustic ranging, 4) multibeam sonar surveying, and 5) strainmeter and tiltmeter systems. Most, if not all of these techniques can be problematic in shallow, turbulent coastal water due to oceanographic noise. The disclosed system can overcome these difficulties and thus complement existing methods.

Figure 14:
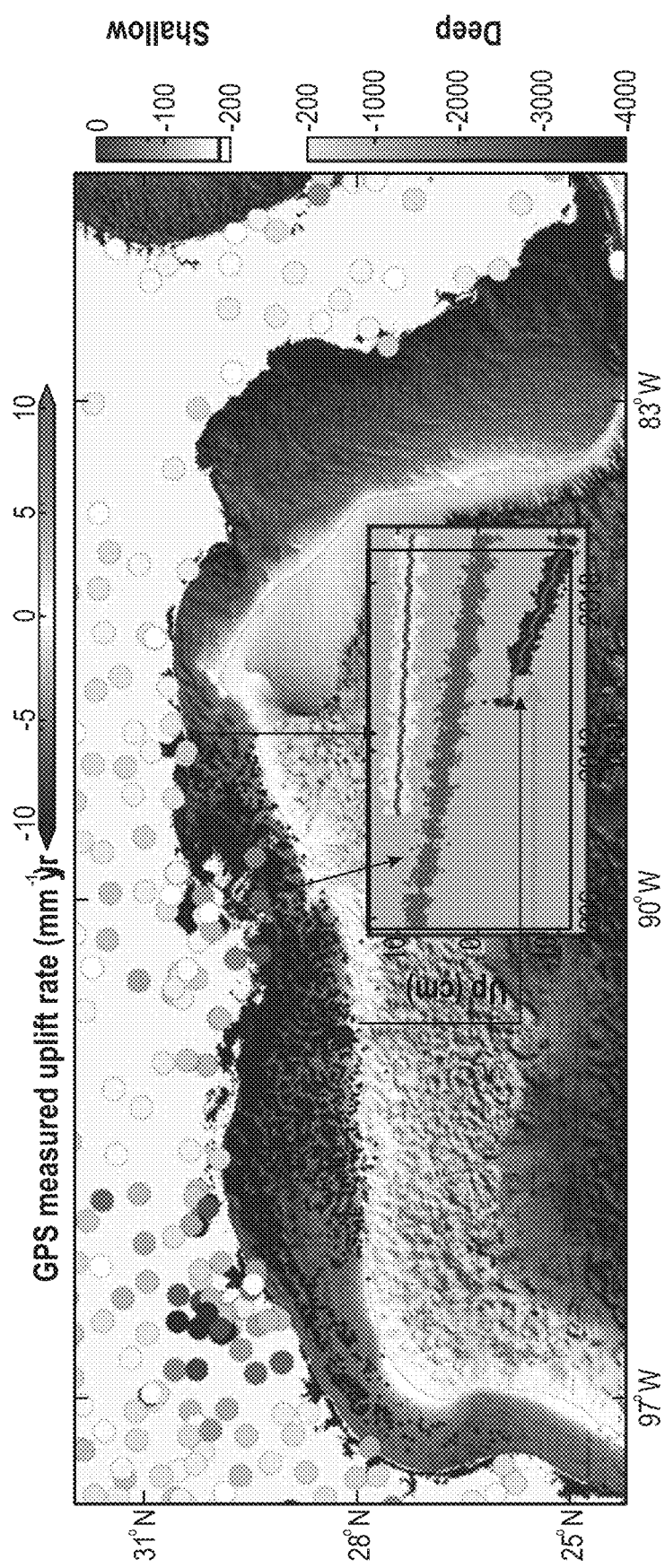
FIG. 14 illustrates example of bathymetry of the Gulf of Mexico, in accordance with various embodiments of the present disclosure.

There are potential applications in shallow water seafloor geodesy. The disclosed system has a number of applications in the shallow continental shelf environment and active margins. For example, FIG. 14 illustrates bathymetry of the Gulf of Mexico. In regions of offshore petroleum extraction, a sparse network could help define the subsidence pattern around oil and natural gas reservoirs as these products are extracted (FIG. 14). Depleted offshore reservoirs have been proposed as possible sites for carbon capture and storage. Monitoring the surface deformation that occurs in these reservoirs as $CO_2$ is added can help to assess reservoir integrity.

The Mississippi Delta (FIG. 14) has long been recognized as an area experiencing subsidence and land loss, due to a combination of natural and human-induced causes. Compaction of younger Holocene sediments may be a significant cause. If dominant, then the subsidence rate should correlate with the thickness of the underlying Holocene section. Some offshore areas in the delta can have considerably thicker Holocene sections compared to on-land areas, hence measuring offshore subsidence could help to better define the processes contributing to subsidence, assuming initial subsidence of the anchor during the settling period was accounted for. In FIG. 14, dots show vertical displacement rate at continuous GPS stations (stations with >5-year observations are used). Some dots show locations of offshore oil platforms by January 2019 (data downloaded from Bureau of Ocean Energy Management at https://www.data-.boem.gov/Main/Mapping.aspx). The inset in FIG. 14 shows vertical displacements of three continuous GPS stations (offset for clarity), scatter are GPS daily time series (step changes due to large earthquakes, antenna replacements, and reference frame changes are corrected), red curves are best fitting curves considering long-term trend, annual and semi-annual variations.

Volcano monitoring can also be achieved. In some volcano-tectonic regions, shallow water environments preclude precise measurement of strain or displacement fields. One example is Lago Nicaragua in southern Nicaragua. The lake occupies more than 8,000 $km^2$, and limits measurement of surface deformation there except in a few marginal areas. The majority of the lake is shallower than 40 meters depth, and hence is amenable to geodetic measurements with the disclosed systems and methods.

Figure 15A:
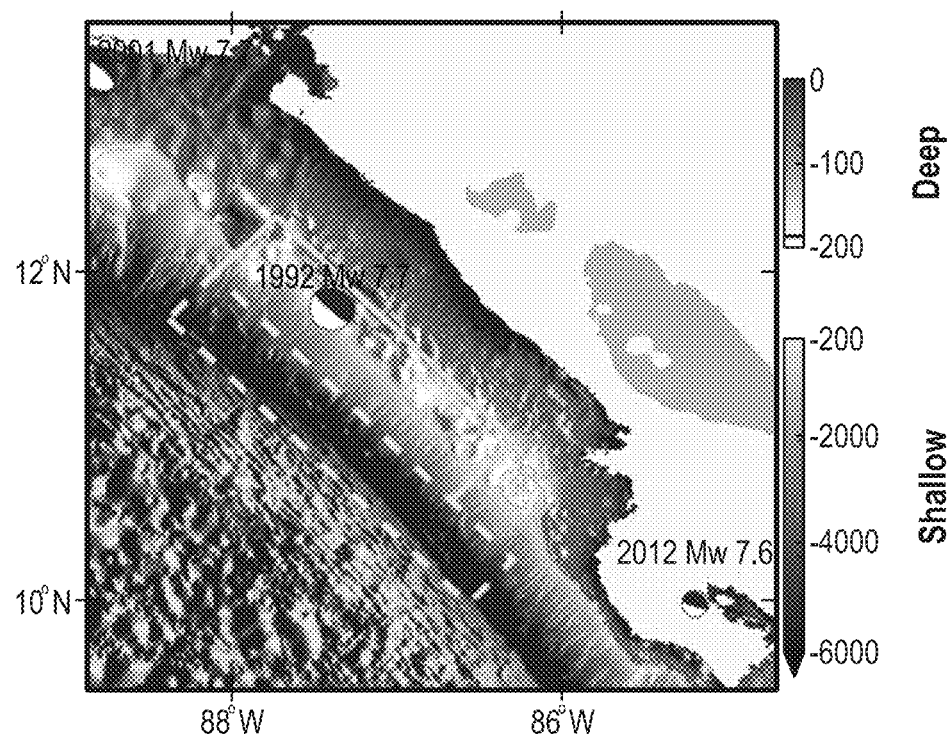
FIGS. 15A-15F illustrate examples of a potential application area in Central America, in accordance with various embodiments of the present disclosure.
Figure 15B:
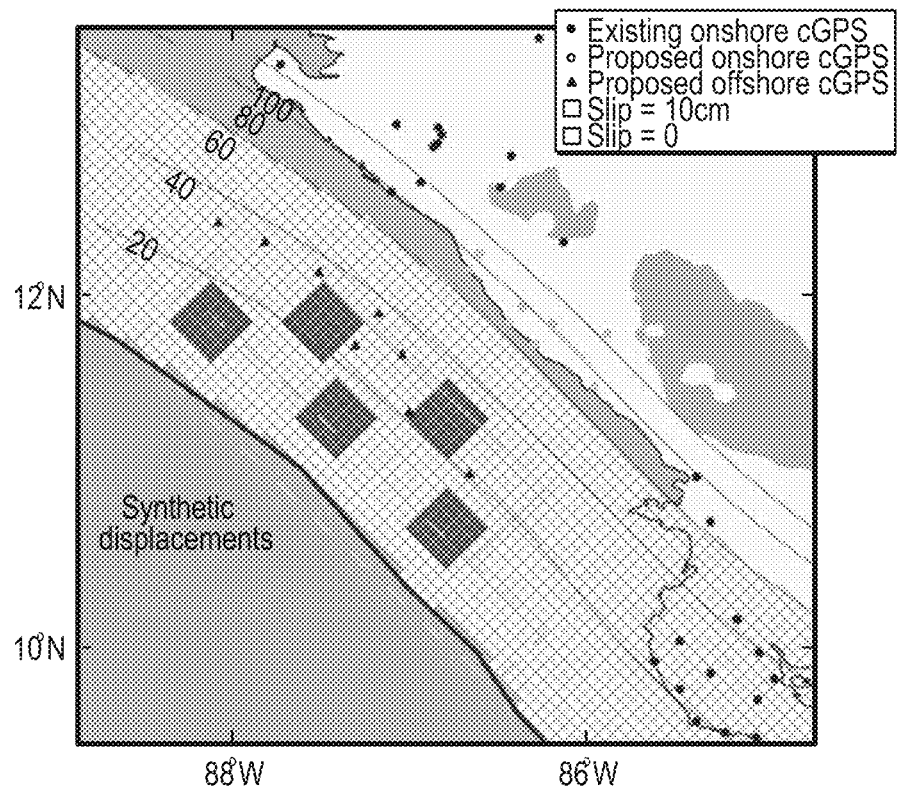

In subduction zones, many of the largest earthquakes occur offshore. Offshore strain accumulation and release processes can be important for understanding megathrust earthquakes and tsunamis, but are usually poorly monitored. FIGS. 15A-15F illustrate examples of a potential application area in Central America. Parts of the Central America subduction system have a large shallow water section. In Nicaragua for example, nearly 50% of the area between the coastline and the trench is shallower than 150 meters (FIG. 15A). In the Nicoya Peninsula of Costa Rica, prior research has found that shallow slow slip events during the interseismic period release a significant amount of accumulated strain, perhaps reducing earthquake magnitude and tsunami potential. Similar results have been observed offshore Ecuador. The disclosed system is a promising geodetic tool to monitor seafloor motion in these shallow fore-arc regions. FIGS. 15A-15F show an example of how such a system could improve slip resolution of offshore events. FIG. 15A shows the bathymetry of the fore-arc region in Central America. 10 cm dip slips were simulated on the plate interface (red patches). FIGS. 15C-15F show model resolution length scales with different datasets. Smoothing parameters used in FIGS. 15C-15F are the same, estimated using existing onshore cGPS data only. An elastic half-space model is used to calculate Green functions, and the Tikhonov regularization method is used to maximize smoothing while minimizing residuals. Even with numerous continuous GPS (cGPS) stations on land (FIGS. 15C, 15D), slip distribution near the trench is not well resolved. Adding stations according to the disclosed systems and methods (e.g., a moored device 100) at selected shallow locations could significantly improve the resolution of estimated slip distribution offshore (FIGS. 15E, 15F).

Figure 15C:
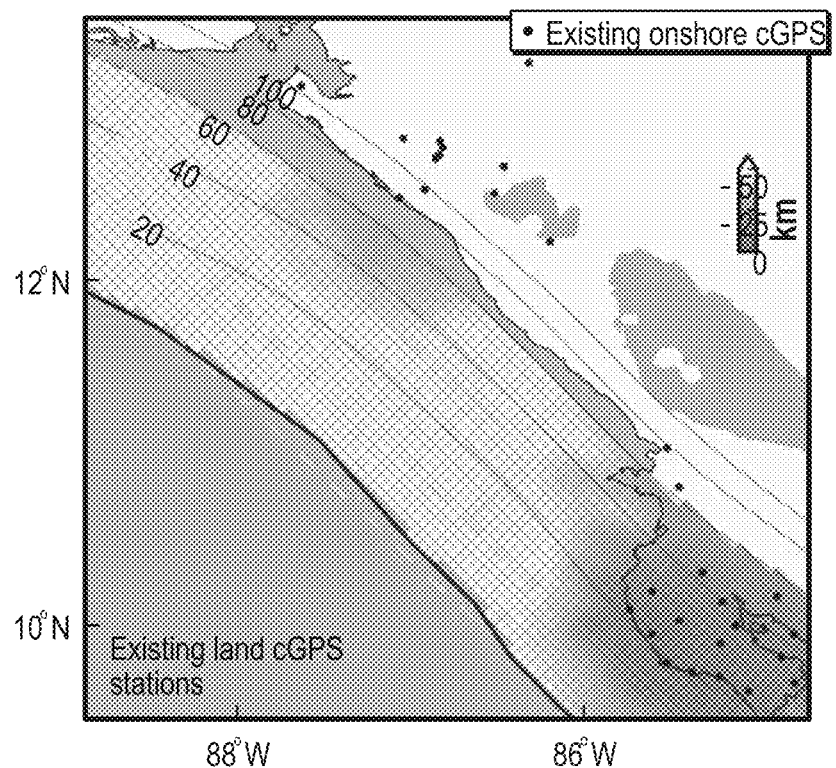
Figure 15D:
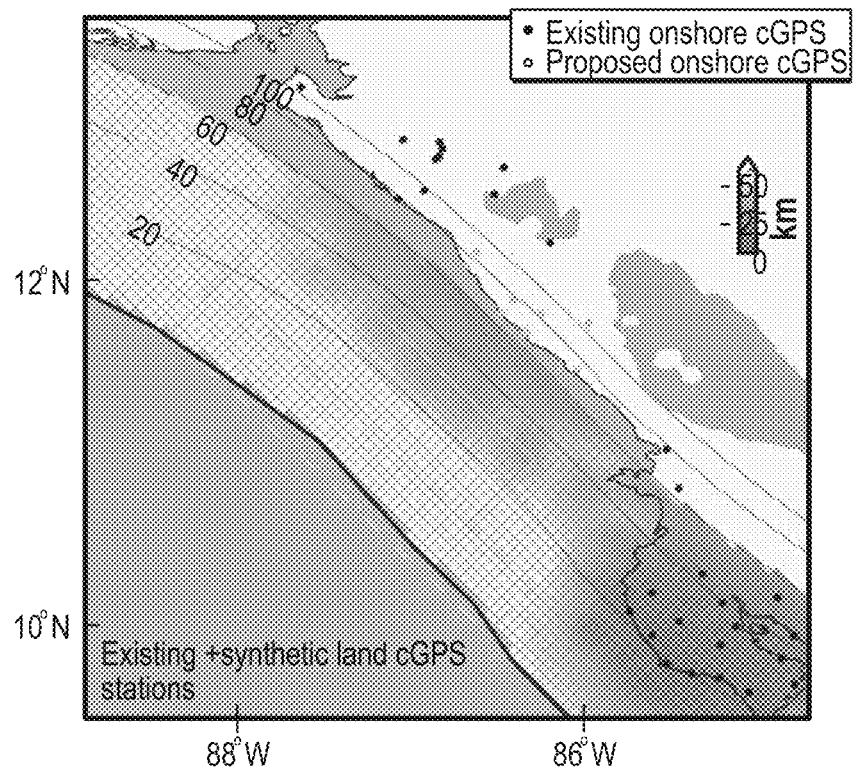
Figure 15E:
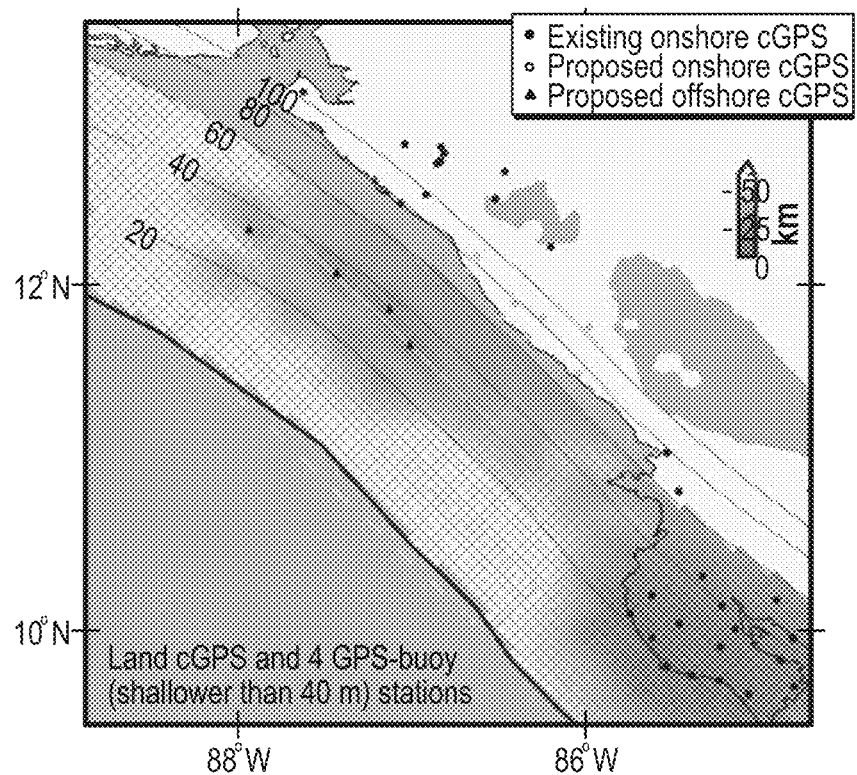
Figure 15F:
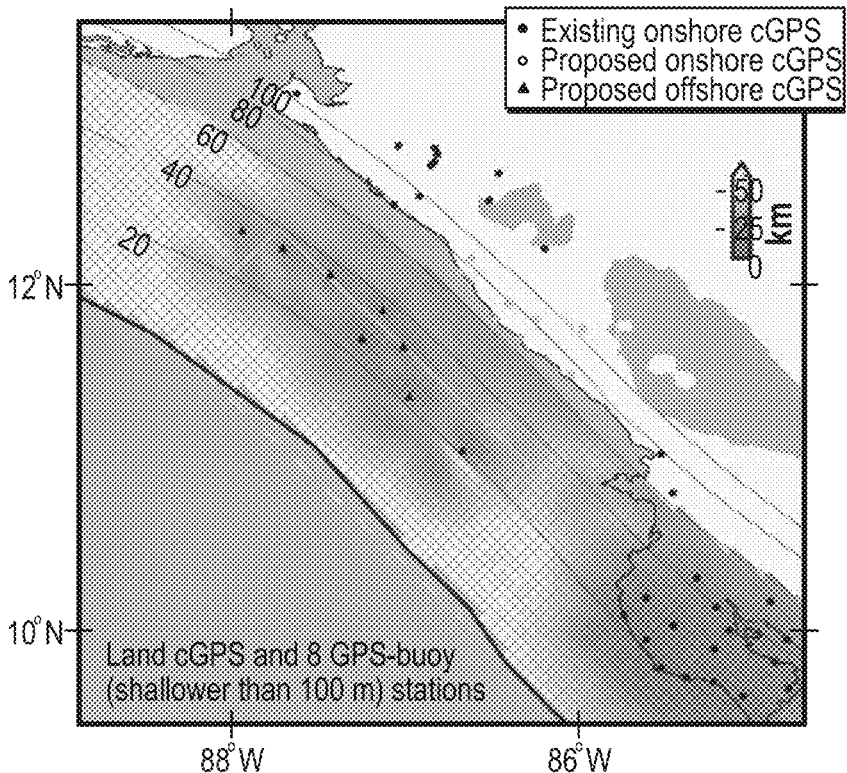

Again, FIGS. 15A-15F show a potential application area in Central America. FIG. 15A shows bathymetry of the fore-arc region in Central America. Beach balls show Mw>7.5 earthquakes between 1 Jan. 1980 and 1 Mar. 2019. The dashed line box outlines the 1992 Nicaragua earthquake tsunami fault model by Satake [1994]. The solid line box outlines the seismological fault model by Ide et al. [1993]. FIGS. 15B-15F show resolution test of slip inversion with/ without seafloor geodetic measurements. The horizontal size of each small patch is 5 km×5 km. Some dots are existing continuous GPS (cGPS) on land, while some dots are proposed cGPS on land, black triangles are synthetic GPS-buoy sites. Lines mark location of the trench. Some lines are slab depth contour (in km). Land GPS and offshore GPS sites are weighted with different uncertainties: land GPS 0.2/0.2/0.4 cm on north/east/vertical directions; offshore GPS 2.0/2.0/0.5 cm on north/east/vertical directions. FIG. 15C shows resolution length scale with existing land cGPS stations. FIG. 15D shows resolution length scale with existing land cGPS stations plus 8 synthetic land cGPS stations. FIG. 15E shows resolution length scale with land cGPS plus 4 synthetic offshore GPS-buoy stations (shallower than 40 m). FIG. 15F shows resolution length scale with land cGPS plus 8 synthetic offshore GPS-buoy stations (shallower than 100 m). For comparison, resolution remains unchanged in Nicoya Peninsula, Costa Rica (lower right of FIG. 15E).

In summary, this disclosure can include a GPS 112 and buoy 103 (e.g., GPS-buoy system) suitable for measuring horizontal and vertical components of shallow water seafloor motion. The system can include a reference station such as a fixed GPS station, a sensor module 115, a spar buoy 103 anchored to seafloor by a heavy ballast (e.g., seafloor marker 121), and a float 118 integrated into or attached to the spar buoy 103. GPS data can be processed in the kinematic mode, and a 3-dimensional transformation can be used to estimate position of the seafloor marker 121 based on GPS position and buoy 103 heading, pitch, and roll measurements. During a test period in Tampa Bay, the system successfully recorded transient events associated with Hurricane Michael and other heavy precipitation events, when current speeds are high. For a single measurement, uncertainty induced by errors in buoy geometry and measurements of the sensor module 115 can be at the centimeter level. Using a median filter, the daily position time series of the anchor have a repeatability of 1-2 cm or better for the three position components. This system can be applied to a variety of study areas, including offshore regions of subduction zones for measuring strain accumulation and release processes. A combination of on-land GPS, GPS-buoys in shallow water, and GPS-acoustic systems or pressure gauges in deep water, would provide complete geodetic coverage for subduction zone earthquake, and tsunami and volcano hazard studies.

Figure 16:
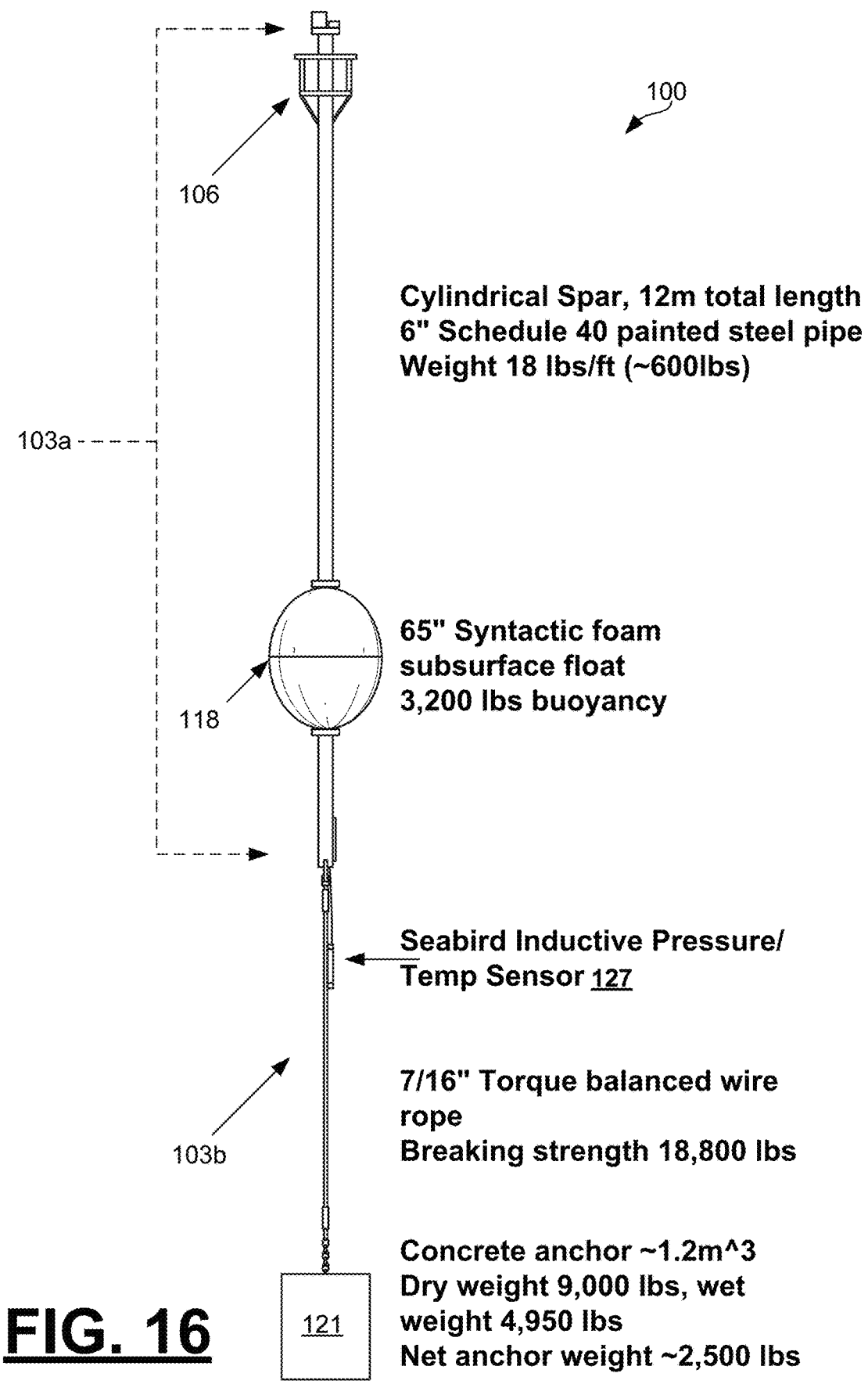
FIG. 16 illustrates another example of a moored device in accordance with various embodiments of the present disclosure.

FIG. 16 illustrates another example of the moored device 100 in accordance with various embodiments of the present disclosure. In some aspects, this disclosure can provide a moored device 100 having a rigid buoy 103 that can be useful for various water depths, including water depths up to 40 meters. The example shown in FIG. 16 depicts that the moored device 100 can be extended to deeper depths (e.g., up to 200 meters or beyond). The moored device 100 can include a buoy 103 having an upper portion 103a (e.g., upper 25-35 meters) that is rigid and a lower portion 103b that is a flexible cable. The lower portion 103b can connect the seafloor marker 121 and the upper portion 103a (including the float 118 and the sensor module 115). The full 3-D orientation of the moored device 100 can be determined at least in part by making additional measurements (e.g., pressure, temperature, or orientation) using at least one of a plurality of sensors 127 which are connected or coupled to the buoy 103. The example of FIG. 16 depicts that one or more sensors manufactured by Sea-Bird Scientific™ can be connected to the lower portion 103b of the buoy 103, in fluid communication with the water, to provide at least one of orientation data, temperature data, pressure data, or potentially other data associated with the water or the moored device 100.

Figure 17:
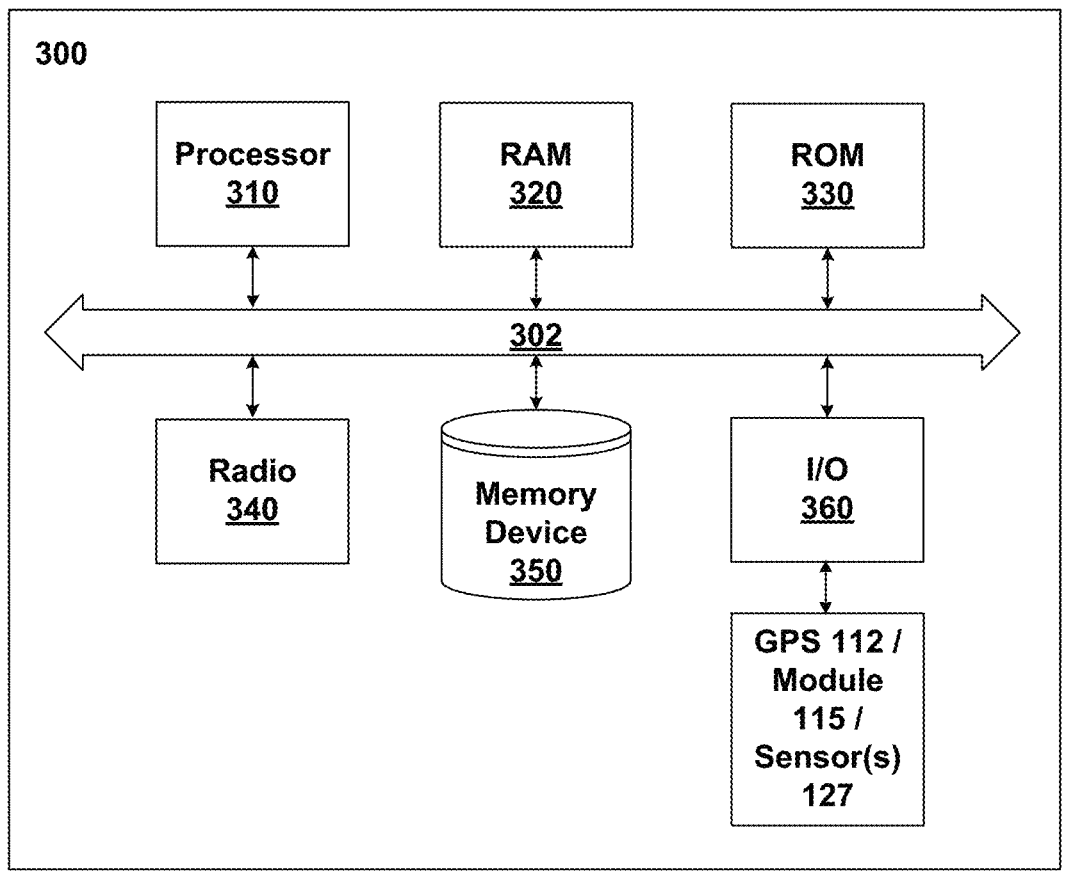
FIG. 17 illustrates an example schematic block diagram of a computing environment which can embody one or more of the systems or methods according to various embodiments of the present disclosure.

FIG. 17 illustrates an example schematic block diagram of a computing architecture 300 that may be employed by any of the systems or methods according to various embodiments described herein. The computing architecture 300 may be embodied, in part, using one or more elements of a specific purpose processing circuit or computing device. The computing architecture 300 can include a processor 310, a random access memory (RAM) 320, a Read Only Memory (ROM) 330, a radio 340, a memory device 350, and an Input Output (I/O) interface 360. The elements of computing architecture 300 are communicatively coupled via one or more local interfaces 302. The elements of the computing architecture 300 are not intended to be limiting in nature, as the architecture may omit elements or include additional or alternative elements.

In various embodiments, the processor 310 may include or be embodied as a general purpose arithmetic processor, a state machine, or an ASIC, for example. The processor 310 may include one or more circuits, one or more microprocessors, ASICs, dedicated hardware, or any combination thereof. In certain aspects and embodiments, the processor 310 is configured to execute one or more software modules which may be stored, for example, on the memory device 350.

The RAM 320 and ROM 330 may include or be embodied as any random access and read only memory devices that store computer-readable instructions to be executed by the processor 310. The memory device 350 stores computer-readable instructions thereon that, when executed by the processor 310, direct the processor 310 to execute various aspects of the embodiments described herein.

As a non-limiting example, the memory device 350 includes one or more non-transitory memory devices, such as an optical disc, a magnetic disc, a semiconductor memory (e.g., a semiconductor, floating gate, or similar flash based memory), a magnetic tape memory, a removable memory, combinations thereof, or any other known non-transitory memory device or means for storing computer-readable instructions. The one or more local interfaces 302 electrically and communicatively couples the processor 310, the RAM 320, the ROM 330, the memory device 350, and the I/O interface 360 so that data and instructions may be communicated among them.

In certain aspects, the processor 310 is configured to retrieve computer-readable instructions and data stored on the memory device 350, the RAM 320, the ROM 330, and/or other storage means and copy the computer-readable instructions to the RAM 320 or the ROM 330 for execution, for example. The processor 310 is further configured to execute the computer-readable instructions to implement various aspects and features of the embodiments described herein. In embodiments where the processor 310 includes a state machine or ASIC, the processor 310 may include internal memory and registers for maintenance of data being processed.

The radio 340 can be any industrial scientific radio that can transmit and receive data on various frequencies. The radio 340 can include a radio device such a Freewave® device that can include gateway, endpoint, repeater or simultaneous endpoint and repeater function in a single radio. In operation, the radio 340 can provide wireless communication with the moored device 100, e.g., an ethernet or serial link between the moored device 100 and a computing device located some distance away from the moored device 100.

The I/O interface 360 includes device input and output interfaces, such as keyboard, pointing device, display, communication, and/or other interfaces. The I/O interface 360 can electrically or communicatively couple at least one computing device of the computing architecture 300 to the GPS 112, the sensor module 115, the sensor(s) 127, or potentially other components of the moored device 100.

Figure 18A:
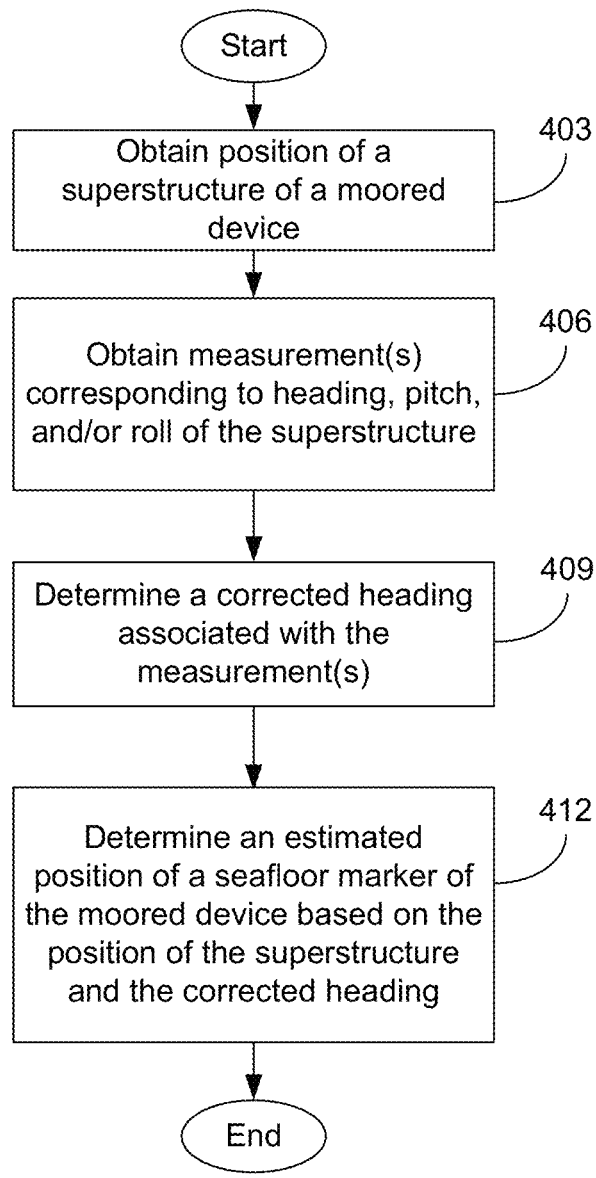
FIGS. 18A and 18B are flow charts illustrating one example of functionality implemented in accordance with various embodiments of the present disclosure.

Referring next to FIG. 18A, shown is a flowchart that provides an example of the operation of a portion of a computing device of the computing architecture 300 (FIG. 17) according to various embodiments. It is understood that the flowchart of FIG. 18A provides merely an example of the many different types of functional arrangements that can be employed to implement the operation of the portion of the computing device as described herein. As an alternative, the flowchart of FIG. 18A can be viewed as depicting examples of steps of a method associated with a moored device 100 according to one or more embodiments.

The process in FIG. 18A can be used to perform geodesy in shallow water. In step 403, the process involves obtaining a position of a superstructure 106 of a moored device 100 (FIG. 1A or FIG. 16). For example, the process can obtain the position of the superstructure 106 from a GPS antenna 112, or a GPS receiver, a digital compass or other sensor module 115 of the moored device 100 (FIG. 1A or FIG. 16).

In step 406, the process can include obtaining, from a sensor module 115, at least one measurement corresponding to a heading, a pitch, or a roll of the superstructure 106. In some instances, the sensor module 115 can include a digital compass or other sensor module that measures heading, pitch, and/or roll every 5 seconds with 0.10 resolution.

In step 409, the process can involve determining a corrected heading associated with at least one of the measurements obtained in step 406. The process can include determining the corrected heading by determining a heading offset associated with the heading obtained in step 406 and applying a magnetic declination to the heading offset. In some examples, a least squares procedure is used.

In step 412, the process involves determining an estimated position of a seafloor marker 121 of the moored device 100 based at least in part on the position of the superstructure 106 (FIG. 1A or FIG. 16) obtained in step 403, and the corrected heading determined in step 409. The estimated position can be a three-dimensional position of the seafloor marker 121 (FIG. 1A or FIG. 16). The process can involve determining a horizontal component and a vertical component of a displacement of the seafloor marker 121 (FIG. 1A or FIG. 16) based at least in part on the three-dimensional position.

Figure 18B:
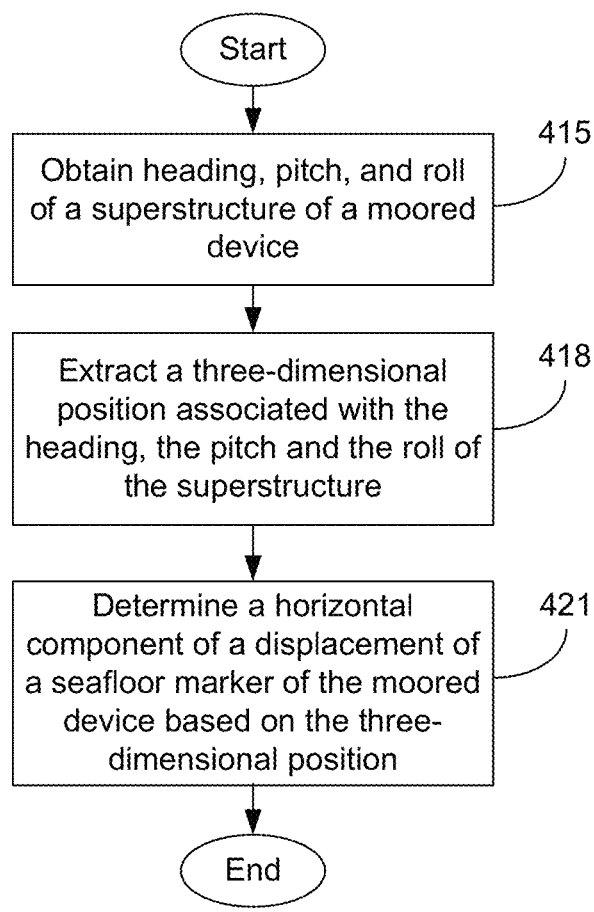

Referring next to FIG. 18B, shown is a flowchart that provides another example of the operation of a portion of a computing device of the computing architecture 300 (FIG. 17) according to various embodiments. It is understood that the flowchart of FIG. 18B provides merely an example of the many different types of functional arrangements that can be employed to implement the operation of the portion of the computing device as described herein. As an alternative, the flowchart of FIG. 18B can be viewed as depicting examples of steps of a method associated with a moored device 100 according to one or more embodiments.

The process in FIG. 18B can be used to perform geodesy in shallow water. In some examples, the process involves a processor and program instructions stored in memory and executable by the processor that, when executed, cause the processor to perform a number of steps. The program instructions can, in some cases, be embodied as at least one application executable in a computing device of the computing architecture 300 (FIG. 17). The processor can be the processor 310 (FIG. 17) and located, e.g., on the moored device 100, near the moored device 100, or away from the moored device 100 at an onshore monitoring station or other suitable location. The computing device can use a communications link or a radio 340 (FIG. 17) to communicate with the moored device 100 (FIG. 1A or FIG. 16).

In step 415, the process involves the computing device obtaining a heading, a pitch, and a roll of a superstructure 106 of the moored device 100 (FIG. 1A or FIG. 16). The computing device can also obtain a position of the superstructure 106 (FIG. 1A or FIG. 16) based at least in part on a reference station (FIG. 1). For example, the reference station can be a GPS station and the position can be a real-time kinematic position.

In step 418, the process can involve the computing device extracting a three-dimensional position associated with the heading, the pitch and the roll of the superstructure 106 (FIG. 1A or FIG. 16). In step 421, the process involves the computing device determining a horizontal component of a displacement of a seafloor marker 121 of the moored device 100 (FIG. 1A or FIG. 16) based at least in part on the three-dimensional position extracted in step 418. The process can involve applying a modified Z-score method to detect outliers in the horizontal component of the displacement. In some examples, the process involves determining a heading offset associated with the heading and applying a magnetic declination to the heading offset.

The computing device can render a user interface comprising one or more graphs. FIG. 5 depicts an example of the computing device rendering graphs of Global Positioning System (GPS) and oceanographic data. FIG. 6 depicts an example of the computing device rendering graphs of heading, pitch, and roll measurements over a sampled time period. FIGS. 7A-7D illustrate examples of the computing device rendering graphs of heading offset and anchor position estimates for a particular date.

The computing device can also generate one or more alerts based at least in part on the displacement of the seafloor marker 121 (FIG. 1A or FIG. 16). One target of interest is shallow slow slip events (SSEs). These are slip events on the plate interface that transpire over weeks or months, compared to seconds to minutes for normal earthquakes. SSE's may be an important strain release mechanism, depending on their frequency and magnitude. Shallow SSE's have been identified in a few subduction zones, including New Zealand and Costa Rica. They may be widespread, but for most subduction zones, on-land instrumentation can be too far away for reliable detection. Offshore detection can be challenging. The present systems and methods can be used to cause the computing device to generate one or more alerts suitable to notify a user about an event, associated with the moored device 100 (FIG. 1A or FIG. 16), that has occurred or is occurring.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. Although the flowcharts show a specific order of execution, it is understood that the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for geodesy in shallow water, comprising:
obtaining, from a sensor module, a position of a superstructure of a moored device;
obtaining, from the sensor module, at least one measurement corresponding to a heading, a pitch, or a roll of the superstructure; and
determining an estimated position of a seafloor marker of the moored device based at least in part on the position of the superstructure, and at least one corrected heading associated with the at least one measurement;
wherein the seafloor marker is below the shallow water at a depth less than 200 meters.

2. The method of claim 1, wherein obtaining the at least one measurement comprises obtaining the heading, the pitch, and the roll of the superstructure.

3. The method of claim 1, wherein the estimated position is a three-dimensional position.

4. The method of claim 3, further comprising determining a horizontal component and a vertical component of a displacement of the seafloor marker based at least in part on the three-dimensional position.

5. The method of claim 1, wherein the superstructure is above the shallow water.

6. The method of claim 1, further comprising determining the at least one corrected heading by determining a heading offset associated with the heading and applying a magnetic declination to the heading offset.

7. The method of claim 6, wherein determining the at least one corrected heading further comprises applying a least squares procedure.

8. A method for geodesy in shallow water, comprising:
a processor; and
program instructions stored in memory and executable by the processor that, when executed, cause the processor to:
obtain a heading, a pitch, and a roll of a superstructure of a moored device; and
determine a horizontal component of a displacement of a seafloor marker of the moored device based at least in part on extracting a three-dimensional position associated with the heading, the pitch and the roll of the superstructure;
wherein the seafloor marker is below the shallow water at a depth less than 200 meters.

9. The method of claim 8, wherein the instructions further cause the processor to obtain a position of the superstructure based at least in part on a reference station.

10. The method of claim 9, wherein the position is a real-time kinematic position and the reference station is a GPS station.

11. The method of claim 8, wherein the instructions further cause the processor to apply a modified Z-score method to detect outliers in the horizontal component of the displacement.

12. The method of claim 8, wherein the instructions further cause the processor to determine a heading offset associated with the heading and apply a magnetic declination to the heading offset.

13. A system for geodesy in shallow water, comprising:
a moored device comprising a superstructure connected to a seafloor marker;
a computing device communicatively coupled to a sensor module connected to the superstructure; and
at least one application executable in the computing device, wherein, when executed, the at least one application causes the computing device to at least:
determine a position of the superstructure;
determine a heading, a pitch, and a roll of the superstructure; and
determine an estimated position of the seafloor marker based at least in part on the position, the pitch, the roll, and a corrected heading associated with the superstructure;
wherein the seafloor marker is below the shallow water at a depth less than 200 meters.

14. The system of claim 13, wherein the estimated position is a three-dimensional position.

15. The system of claim 13, wherein the seafloor marker is below the shallow water at a depth less than 40 meters.

16. The system of claim 13, wherein the superstructure connected to the seafloor marker is connected via at least one of a wire rope or a cable configured to provide at least a portion of a connection to the seafloor marker and the superstructure; and at least one of a plurality of sensors is coupled to the at least one of the wire rope or the cable.

17. The system of claim 13, wherein the superstructure connected to the seafloor marker is connected via a buoy having a first portion that is rigid and a second portion that is a flexible cable.

18. The system of claim 13, wherein the seafloor marker is below the shallow water at a depth of between 40 meters and 200 meters.

19. The system of claim 13, wherein the at least one application causes the computing device to at least:
determine a heading offset associated with the heading; and
wherein the corrected heading associated with the superstructure is determined based at least in part on applying a magnetic declination to the heading offset.

* * * * *